US009605788B1

(12) United States Patent
Corte, Jr. et al.

(10) Patent No.: US 9,605,788 B1
(45) Date of Patent: *Mar. 28, 2017

(54) METHOD AND APPARATUS FOR REMOVING, REPAIRING, REFURBISHING, REPLACING, AND/OR INSTALLING VALVE BETWEEN TWO FIXED SPOOL PIECES

(71) Applicant: Cortec, L.L.C., Houma, LA (US)

(72) Inventors: Bobby J. Corte, Jr., Houma, LA (US); Lynn A. Ledet, Houma, LA (US)

(73) Assignee: Cortec, L.L.C., Houma, LA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/050,764

(22) Filed: Feb. 23, 2016

Related U.S. Application Data

(63) Continuation of application No. 14/067,384, filed on Oct. 30, 2013, now Pat. No. 9,267,615.

(51) Int. Cl.
F16K 99/00 (2006.01)
F16L 55/07 (2006.01)
F16L 23/00 (2006.01)

(52) U.S. Cl.
CPC ............ F16L 55/07 (2013.01); F16K 99/00 (2013.01); F16L 23/003 (2013.01); Y10T 137/598 (2015.04)

(58) Field of Classification Search
CPC .... F16K 55/124; F16K 55/128; F16K 55/132; F16L 27/12; F16L 37/144
See application file for complete search history.

(56) References Cited

U.S. PATENT DOCUMENTS

| | | |
|---|---|---|
| 1,213,132 A | 1/1917 | Peterson |
| 3,096,999 A | 7/1963 | Ahlstone et al. |
| 3,291,442 A | 12/1966 | Cranage |
| 3,339,947 A | 9/1967 | Maisey |
| 3,427,051 A | 2/1969 | White et al. |
| 3,843,167 A | 10/1974 | Gronstedt |
| 3,874,706 A | 4/1975 | Arnold |
| 3,889,985 A | 6/1975 | Gartmann |
| 4,008,972 A | 2/1977 | Lindberg |
| 4,052,045 A | 10/1977 | Shaddix |
| 4,153,278 A | 5/1979 | Ahlstone |
| 4,163,571 A | 8/1979 | Nash |
| 4,195,865 A | 4/1980 | Martin |
| 4,219,226 A | 8/1980 | Kappenhagen |
| 4,337,971 A | 7/1982 | Kendrick |
| 4,371,198 A | 2/1983 | Martin |
| 4,429,903 A | 2/1984 | Baker |
| 4,436,325 A | 3/1984 | Miller |

(Continued)

Primary Examiner — Craig Schneider
Assistant Examiner — Kevin Barss
(74) Attorney, Agent, or Firm — Garvey, Smith. Nehrbass & North LLC; Brett A. North

(57) ABSTRACT

Disclosed are methods and apparatuses for removing and/or installing valves located between two fixed pipe spool pieces. The valves can be located between first and second immovable pipe spool pieces having a fixed distance between the first and second immovable pipe spool pieces, and in the process of removal a gap is created between the first and second immovable pipe spool pieces. The immovable pipe spool pieces can have longitudinal axes which are parallel, and the gap created along a longitudinal line which is parallel to the two longitudinal axes of the pipe spool pieces. The longitudinal axes of the first and second pipe spool pieces can be coincident with each other.

20 Claims, 38 Drawing Sheets

(56) References Cited

U.S. PATENT DOCUMENTS

| | | | |
|---|---|---|---|
| 4,489,472 | A | 12/1984 | Cabrit et al. |
| 4,541,934 | A | 9/1985 | Hakola |
| 4,566,168 | A | 1/1986 | Stromberg |
| 4,610,471 | A | 9/1986 | Halen et al. |
| 4,936,609 | A | 6/1990 | Metcalfe |
| 6,659,511 | B2 | 12/2003 | Yoneyama et al. |
| 2004/0003845 | A1 | 1/2004 | Biszko |
| 2012/0090700 | A1 | 4/2012 | Multer et al. |
| 2014/0261776 | A1 | 9/2014 | Krywitsky |

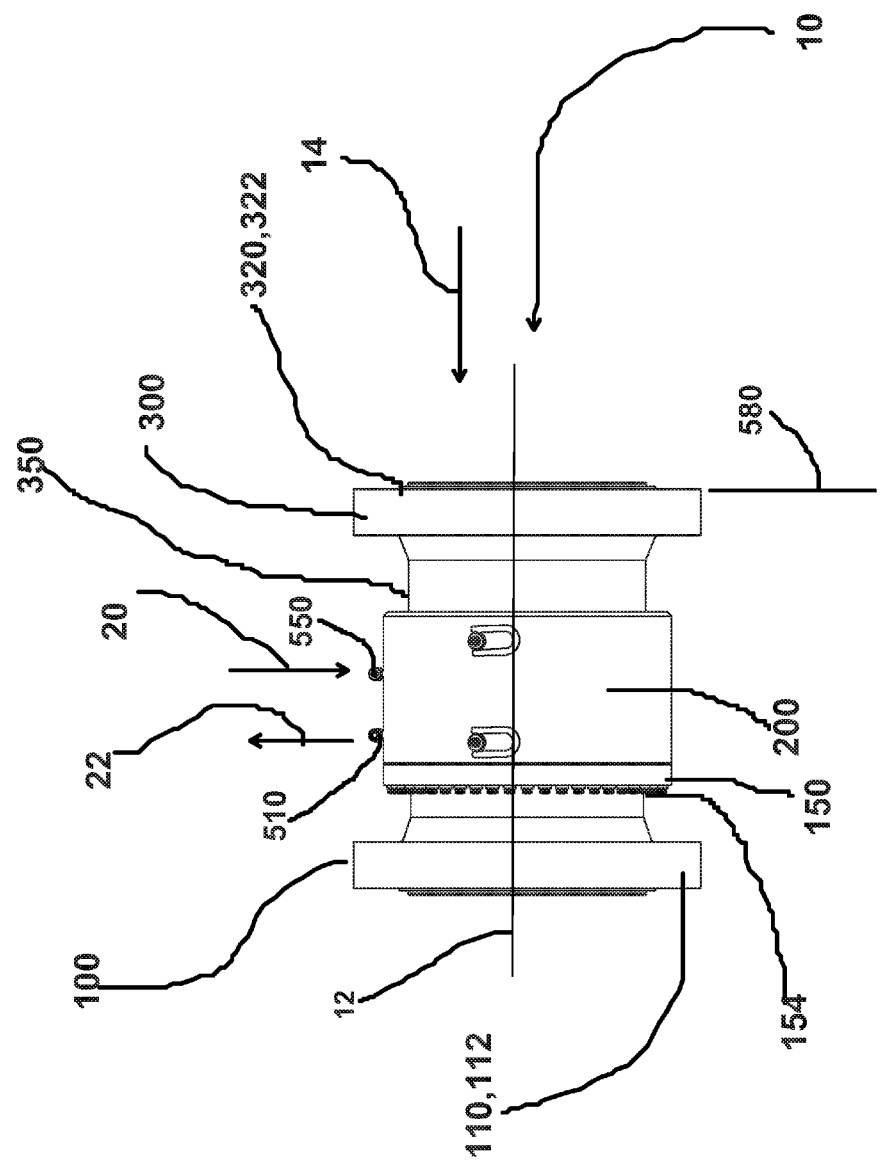

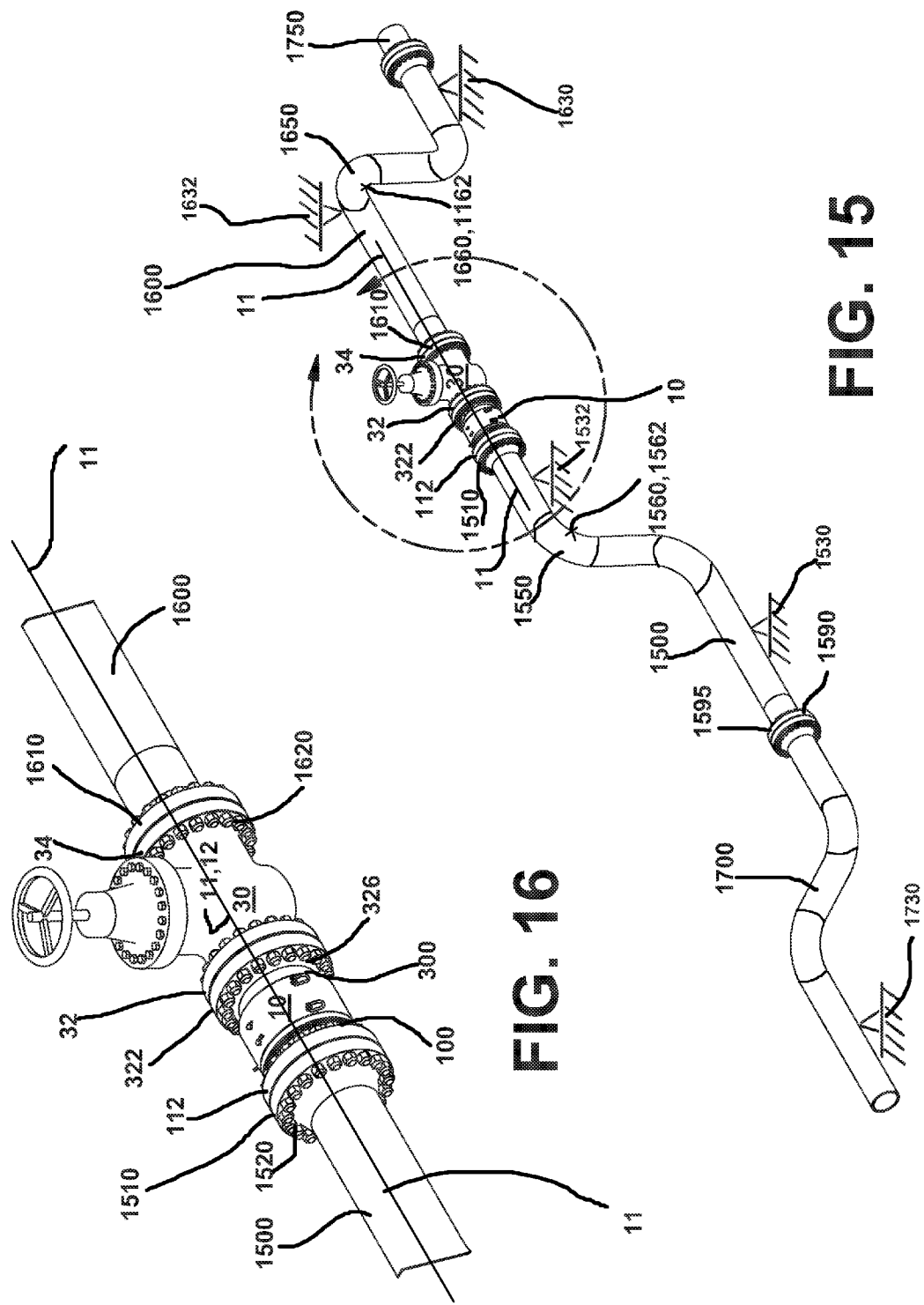

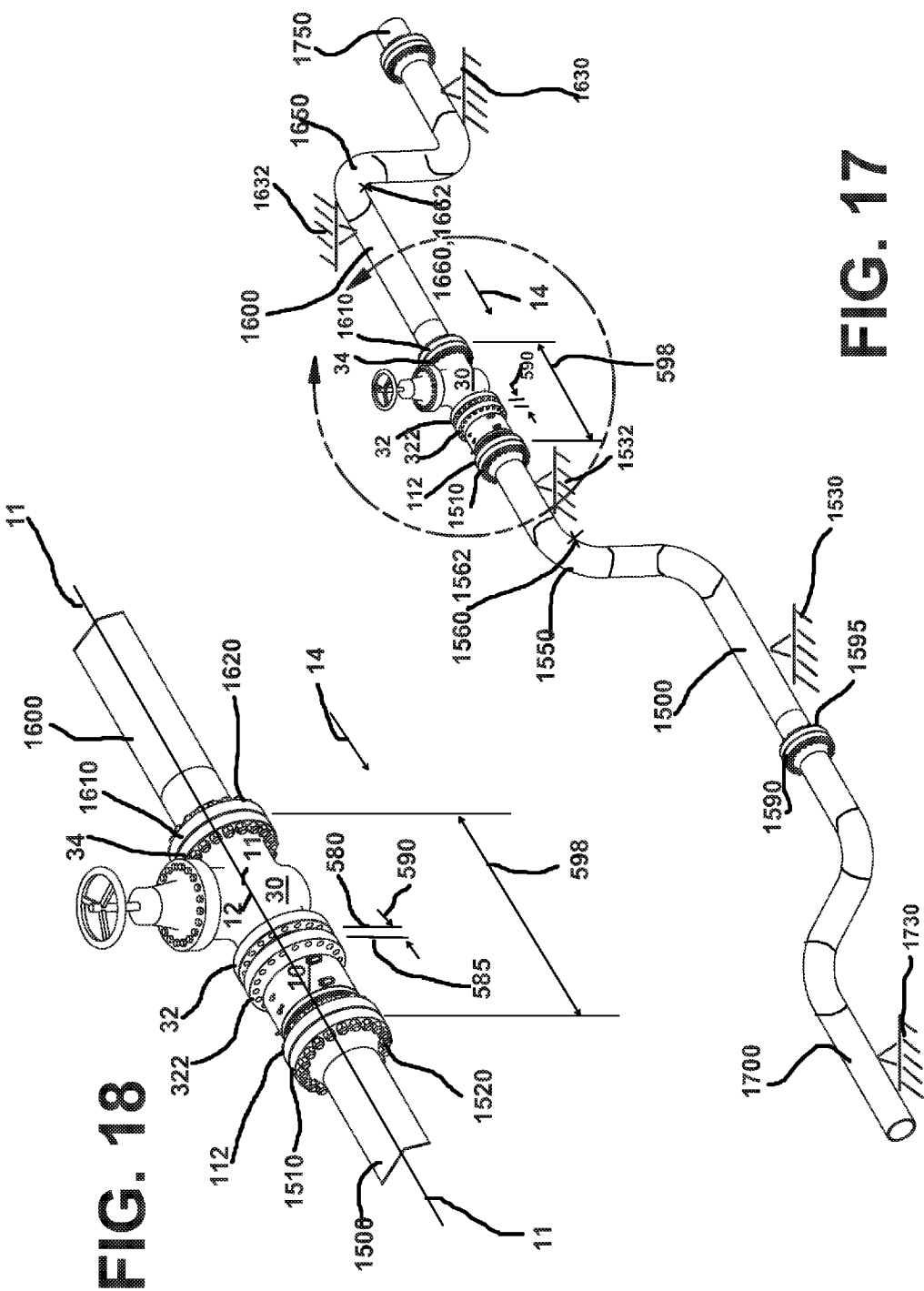

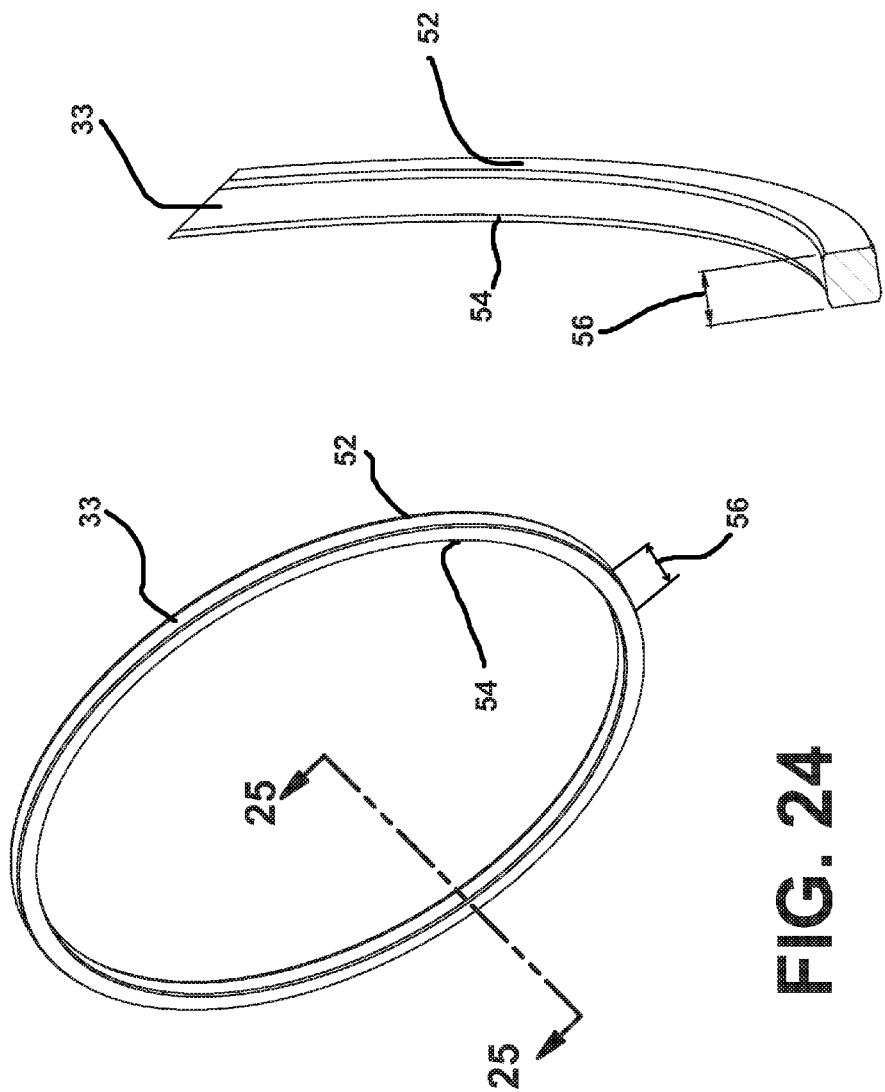

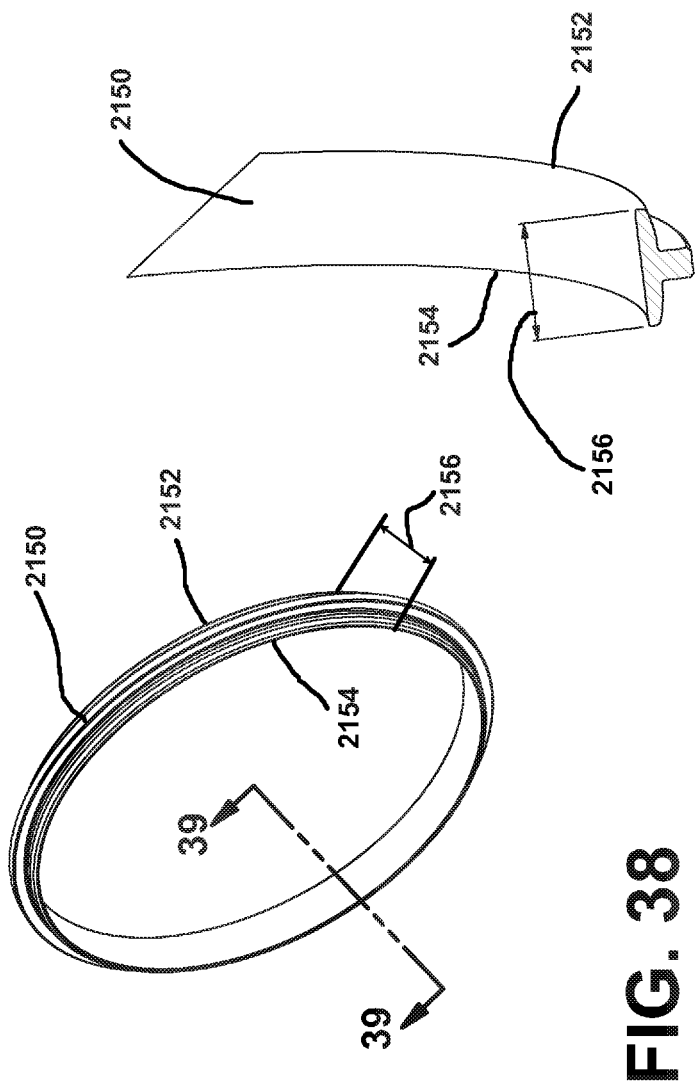

METHOD AND APPARATUS FOR REMOVING, REPAIRING, REFURBISHING, REPLACING, AND/OR INSTALLING VALVE BETWEEN TWO FIXED SPOOL PIECES

CROSS-REFERENCE TO RELATED APPLICATIONS

This is a continuation of U.S. patent application Ser. No. 14/067,384, filed Oct. 30, 2013 (issued as U.S. Pat. No. 9,267,615 on Feb. 23, 2016).

STATEMENT REGARDING FEDERALLY SPONSORED RESEARCH OR DEVELOPMENT

Not applicable

REFERENCE TO A "MICROFICHE APPENDIX"

Not applicable

BACKGROUND

Installing and/or removing valves for repair, reconstruction, and/or replacement in confined spaces is challenging, time consuming, and expensive. More particularly, in working with valves located between two fixed pipe spool pieces it is often necessary to remove one or both fixed pipe spool pieces to allow enough spaced to remove the valve from the pipe spool pieces.

Many times after removing the fasteners connecting the valve to the pipe spool pieces, sealing and/or other valving components resist valve removal from its longitudinal position between the two pipe spool pieces. In order to provide the necessary longitudinal space or gap to navigate the valve around and/or remove the sealing and/or other blocking components between the valve and the pipe spool pieces, sections of one or both of the pipe spool pieces are disconnected at points spaced apart from the valve itself.

Disconnecting portions of pipe spool pieces at spaced apart locations takes much effort and substantially increases the overall time to remove, repair, refurbish, replace, and/or install valves between first and second pipe spool pieces.

In prior art systems, especially in confined space type pipe spool systems, merely removing the connectors detachably connecting the valve to the pipe spool pieces does not allow the valve to be removed from its position between the pipe spool pieces without risking damage to the valve, sealing components, and/or pipe spool pieces. Moving the valve away from its position between the pipe spool piece envisions the case where the longitudinal axis of the valve is moved away from a position where its longitudinal axis is coincident with the longitudinal axis of the pipe spool pieces to a position where its longitudinal axis is spaced apart from the longitudinal axis of the pipe spool pieces.

Risk of damage to the valve, sealing components, and/or pipe spool pieces arises because typically sealing rings used to affect a seal between the connections between the valve and pipe spool pieces have a width or thickness which is not flexible enough to bend or be squeezed between the valve and pipe spool pieces such as when the valve is attempted to be moved in a lateral direction relative to the pipe spool pieces' longitudinal axis. In prior art cases, in order to safely remove a valve from between two pipe spool pieces without causing damage to the valve, sealing components, and/or pipe spool pieces, it is necessary to relocate, move, and/or remove all or part of at least one of the pipe spool pieces to provide a sufficient space between the connecting components of the valve and pipe spool pieces to allow removal of the sealing components and/or circumlocution around such sealing components.

SUMMARY

One embodiment generally relates to methods and apparatuses for removing and/or installing valve between two fixed pipe spool pieces.

In various embodiments the first and second immovable pipe spool pieces can be considered immovable based on their connection to a surface such as by welding. In other embodiments the pieces can be considered immovable based on being an anchoring location for other pipe spool pieces.

In various embodiments removal, repair, refurbishment, replacement, and/or installation of a valve between connecting pipe spool pieces can be affected by creation of a gap between the valve and one or both of the connecting pipe spool pieces without relocating, moving, and/or removing all or part of at least one of the pipe spool pieces where the created gap provides sufficient space between the connecting components of the valve and pipe spool pieces to remove the valve such as by allowing removal of sealing components (e.g., one or more sealing rings between sets of connecting flanges) and/or circumlocution around such sealing components.

In various embodiments the connection between the valve and pipe spool will not include a separable sealing ring and the sealing member is non-removably connected to the valve and/or connecting pipe spool piece. However, a gap is still required to remove the valve and move around the dimensions of the components making the seal between the valve and the connecting pipe spool piece.

In various embodiments removal, repair, refurbishment, replacement, and/or installation of a valve between connecting pipe spool pieces can be affected by creation of a gap between the valve and one or both of the connecting pipe spool pieces without moving the closest weld elbow in the connecting pipe spool pieces to provide sufficient space between the connecting components of the valve and connecting pipe spool pieces, such as by allowing removal of sealing components (e.g., one or more sealing rings between sets of connecting flanges) and/or circumlocution around such sealing components.

In various embodiments weld elbows or weld fittings are envisioned to include weld elbows, weld tees, and/or weld crosses. In various embodiments elbows are envisioned to include a bend greater than or equal to about 30, 45, 90, 120, 145, and 180 degrees. In various embodiments the bend in an elbow is envisioned to be a range between about any two of the specified angles.

In various embodiments removal, repair, refurbishment, replacement, and/or installation of a valve between connecting pipe spool pieces can be affected by creation of a gap between the valve and one or both of the connecting pipe spool pieces while a point on an adjacent weld elbow in the connecting pipe spool pieces remains stationary in three dimensional space in creating the gap where the created gap provides sufficient space between the connecting components of the valve and pipe spool pieces to remove the valve such as by allowing removal of sealing components (e.g., one or more sealing rings between sets of connecting flanges) and/or circumlocution around such sealing components.

In various embodiments remaining stationary envisions movement of the point of less than about ¼, ½, ¾, 1, 1.5, 2, 2.5, 3, 3.5, 4, 4.5, 5, 5.5, and 6 inches. In various embodiments the movement for remaining stationary can be can be between about two of any of the specified dimensions in this paragraph.

In various embodiments remaining stationary envisions movement of the point of greater than about ¼, ½, ¾, 1, 1.5, 2, 2.5, 3, 3.5, 4, 4.5, 5, 5.5, and 6 inches. In various embodiments the movement for remaining stationary can be can be between about two of any of the specified dimensions in this paragraph.

In various embodiments removal, repair, refurbishment, replacement, and/or installation of a valve between connecting pipe spool pieces can be affected by creation of a gap between the valve and one or both of the connecting pipe spool pieces during a time period when the longitudinal axis of the valve remains coincident with the common longitudinal axis of the connecting pipe spool pieces, where the created gap provides sufficient space between the connecting components of the valve and pipe spool pieces to remove the valve such as by allowing removal of sealing components (e.g., one or more sealing rings between sets of connecting flanges) and/or circumlocution around such sealing components.

In various embodiments removal, repair, refurbishment, replacement, and/or installation of a valve between connecting pipe spool pieces can be affected by creation of a gap between the valve and one or both of the connecting pipe spool pieces without cutting either or both connecting pipe spool pieces which cut pipe spool pieces will later have to be reattached to the cut portions by welding or other connecting means, where the created gap provides sufficient space between the connecting components of the valve and pipe spool pieces to remove the valve such as by allowing removal of sealing components (e.g., one or more sealing rings between sets of connecting flanges) and/or circumlocution around such sealing components.

In various embodiments removal, repair, refurbishment, replacement, and/or installation of a valve between connecting pipe spool pieces can be affected by creation of a gap between the valve and one or both of the connecting pipe spool pieces without removing/detaching one or more supports to either or both pipe spool pieces which supports will later be reattached to pipe spool pieces, where the created gap provides sufficient space between the connecting components of the valve and pipe spool pieces to remove the valve such as by allowing removal of sealing components (e.g., one or more sealing rings between sets of connecting flanges) and/or circumlocution around such sealing components.

In one embodiment a subset of the total number of threaded fasteners around a particular bolt circle can be removed leaving one or more remaining bolts on the bolt circle in a loosened condition. In one embodiment at least an area of 180 degrees around a bolt circle can be removed while the remaining bolts making up less than 180 degrees can remain in a loosened condition.

In one embodiment a valve can be located between first and second immovable pipe spool pieces having a fixed distance between the first and second immovable pipe spool pieces, and a gap created between the first and second immovable pipe spool pieces. In one embodiment the two immovable pipe spool pieces have longitudinal axes which are parallel, and the gap is made along a longitudinal line which is parallel to the two longitudinal axes of the pipe spool pieces. In one embodiment the two longitudinal axes of the first and second pipe spool pieces are coincident with each other.

In one embodiment the removal, repair, refurbishment, replacement, and/or installation of a valve connected to first and second immovable pipe spool pieces can occur by creating a gap for valve removal, repair, and/or reconstruction without moving either the first or second pipe spool piece.

In one embodiment the removal, repair, refurbishment, replacement, and/or installation of a valve connected to first and second immovable pipe spool pieces can occur by creating a gap for valve removal, repair, and/or reconstruction without moving either the first or second pipe spool piece at a plurality of points spaced from the valve but not past or beyond a first turn or elbow of either the first or second pipe spool pieces.

In one embodiment the removal, repair, refurbishment, replacement, and/or installation of a valve connected to first and second immovable pipe spool pieces can occur by creating a gap for valve removal, repair, and/or reconstruction while maintaining a fixed distance between the first and second pipe spool pieces at a plurality of points spaced from the valve but not past or beyond a first turn or elbow of the first and second pipe spool pieces.

In one embodiment the removal, repair, refurbishment, replacement, and/or installation of a valve connected to first and second immovable pipe spool pieces can occur by creating a gap for valve removal, repair, and/or reconstruction without applying an external force on either the first or second pipe spool piece beyond any force created by pressurizing the expanding/contracting device.

In one embodiment the removal, repair, refurbishment, replacement, and/or installation of a valve connected to first and second immovable pipe spool pieces can occur by creating a gap for valve removal, repair, and/or reconstruction and with the expandable/retractable connecting device being removed with the valve leaving in place the first and second pipe spool pieces.

In one embodiment, expansion and/or contraction can occur at a time when the through bore of the expansion/contraction device is not at an elevated pressure, or is substantially at atmospheric pressure. In one embodiment the hydraulic pressure to expand or contract is greater than the pressure in the through bore at the time of expansion and/or contraction.

In various embodiments the size of the gap for valve insertion or removal can be less than about ¼, ½, ¾, 1, 1.5, 2, 2.5, 3, 3.5, 4, 4.5, 5, 5.5, and 6 inches. In various embodiments the size of the gap can be between about two of any of the specified dimensions in this paragraph.

In various embodiments the working pressure (e.g., internal line pressure) of the valve, first and second pipe spool pieces can be at least 150, 200, 300, 400, 500, 600, 700, 800, 900, 1000, 1250, 1500, 1750, 2000, 2250, 2300, 2350, 2400, 2500, 2600, 2700, 2800, 2900, 3000, 3100, 3200, 3300, 3400, 3500, 3600, 3700, 3800, 3900, 4000, 4200, 4400, 4500, 4600, 4800, 5000, 5200, 5400, 5500, 5600, 5800, 6000, 6200, 6250, 6300, and/or 6500 psi. In various embodiments the working pressure can be between two of any of the specified working pressures in this paragraph.

In various embodiments a portable hydraulic system is brought to the expandable/retractable device and used to expand and/or retract the expandable retractable device. In various embodiments the portable hydraulic system uses drilling rig and/or platform power to power the hydraulic pump for the portable hydraulic system.

While certain novel features of this invention shown and described below are pointed out in the annexed claims, the invention is not intended to be limited to the details specified, since a person of ordinary skill in the relevant art will understand that various omissions, modifications, substitutions and changes in the forms and details of the device illustrated and in its operation may be made without departing in any way from the spirit of the present invention. No feature of the invention is critical or essential unless it is expressly stated as being "critical" or "essential."

The drawings constitute a part of this specification and include exemplary embodiments to the invention, which may be embodied in various forms.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein:

FIG. 3 is a side view of the expandable/retractable device shown in FIG. 1, shown in an extended state.

FIG. 15 is a perspective view of one embodiment of the expandable/retractable device connecting a valve connected by flanges between two pipe spool pieces.

FIG. 16 is an enlarged perspective view of the connection between the valve and pipe spool pieces of FIG. 15.

FIG. 17 is the system of pipe spools with a valve connected by flanges between two pipe spool pieces of FIGS. 15 and 16, wherein the expandable/retractable device has been used to provide a gap to remove the valve without moving either connecting pipe spool piece.

FIG. 18 is an enlarged perspective view of the gap created between the valve and pipe spool pieces of FIG. 17.

FIG. 24 is a perspective view of one embodiment of a sealing ring that can be used to seal between the valve and its nearest connection, this embodiment showing a sealing ring for a flange type connection.

FIG. 25 is a sectional view of the sealing ring of FIG. 24 taken through the lines 25-25 of FIG. 24.

FIG. 38 is a perspective view of one embodiment of a sealing ring that can be used to seal between the valve and its nearest connection, this embodiment showing a sealing ring for a wedge type bracket and hub connection.

FIG. 39 is a sectional view of the sealing ring of FIG. 38 taken through the lines 38-38 of FIG. 38.

DETAILED DESCRIPTION

Detailed descriptions of one or more preferred embodiments are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in any appropriate system, structure or manner.

Figure 1:
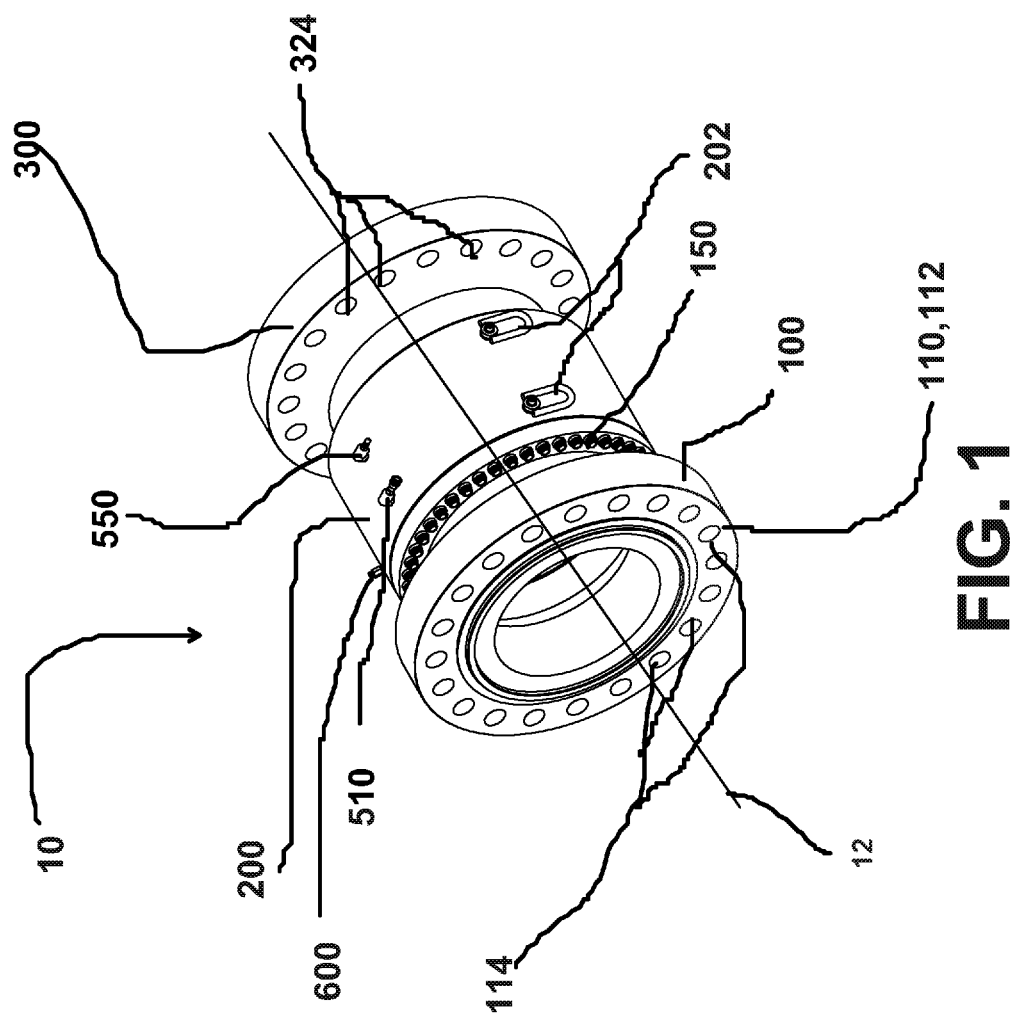
FIG. 1 is a perspective view of one embodiment of an expandable/retractable device.
Figure 2A:
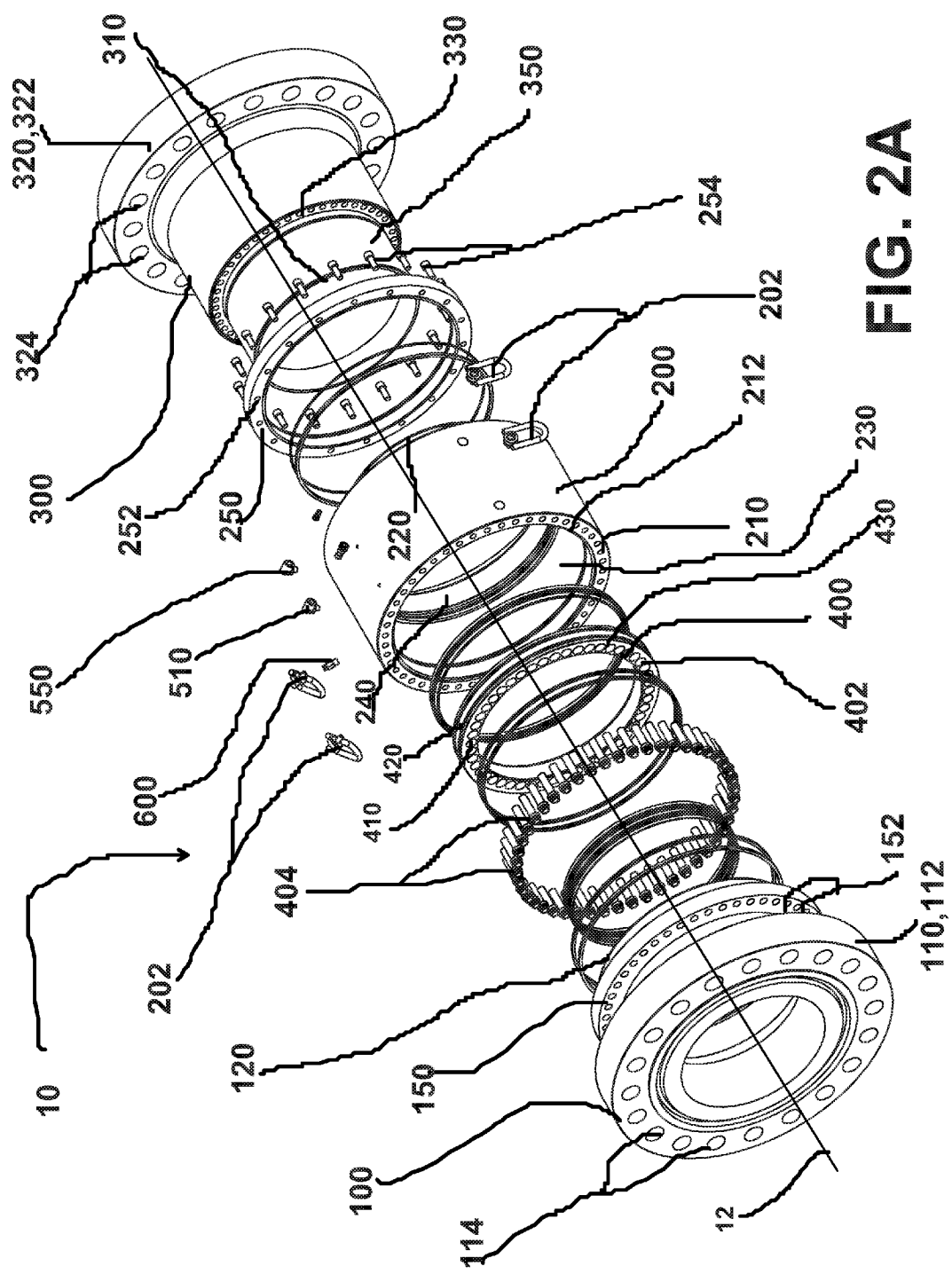
FIG. 2A is an exploded perspective view of the expandable/retractable device shown in FIG. 1.
Figure 2B:
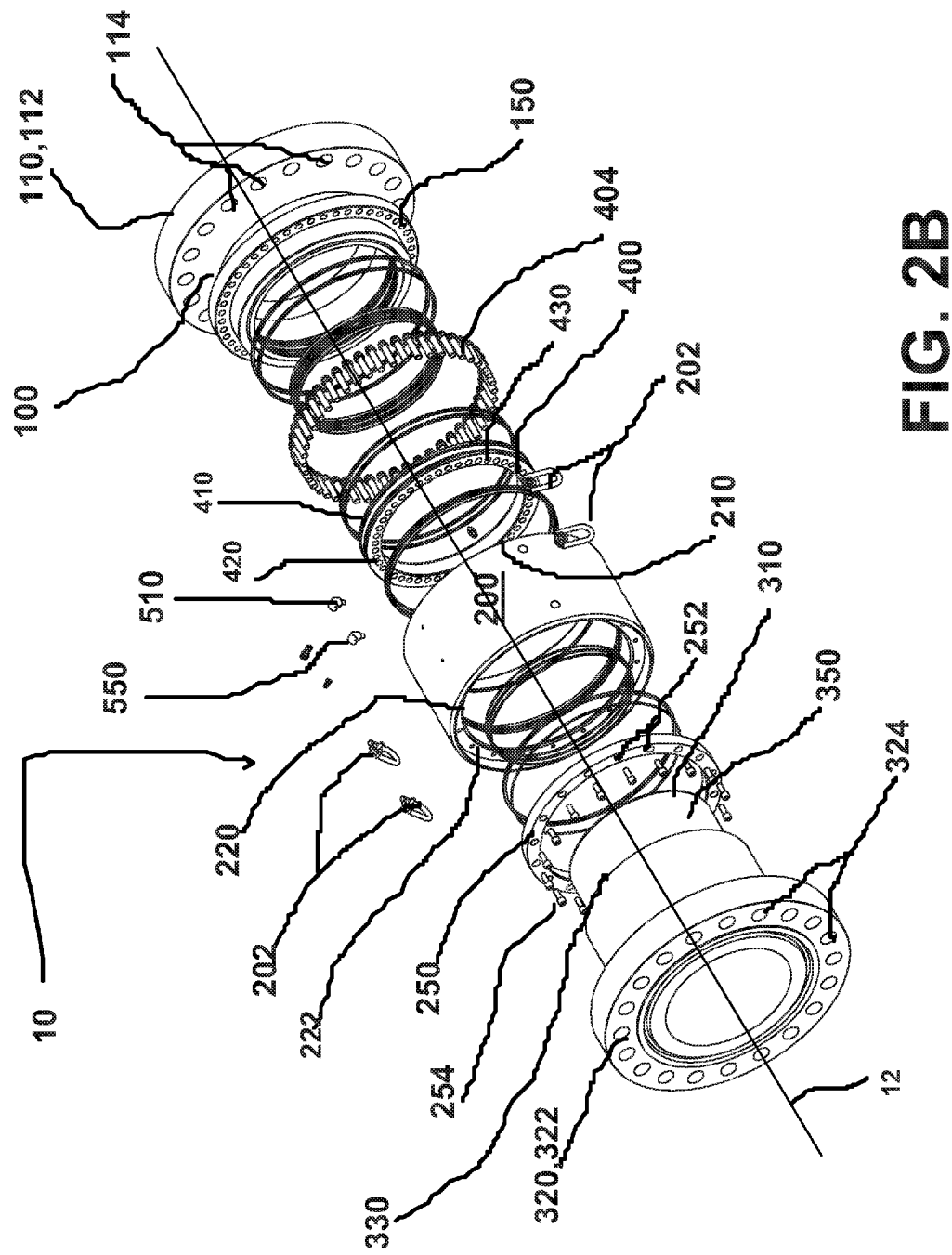
FIG. 2B is an exploded perspective view of the expandable/retractable device of FIG. 2A, but shown from the opposing end of telescoping unit.

FIG. 1 is a perspective view of one embodiment of expandable/retractable device 10. Generally, expandable/retractable device can comprise fixed section 100 and retracting/extending section 300. Section 300 can be slidably connected to section 100 and have a maximum longitudinal amount of retraction/extension. FIG. 2A is an exploded perspective view of the expandable/retractable device 10. FIG. 2B is an exploded perspective view of the expandable/retractable device 10, but shown from the opposing end of telescoping unit.

In one embodiment section 300 can be sealingly and slidably connected to section 100.

Section 100 can comprise first end 110 and second end 120. On first end 110 can be a connecting member such as a connecting flange 112. Section 100 can also include an intermediate connecting member such as connecting flange 150, which can include a plurality of openings 154. Between first end 110 and second end 120 can be interior bore 125. Interior bore 125 can include inner surface 130. Detachably connectable to section 100 can be body 200.

Figure 9:
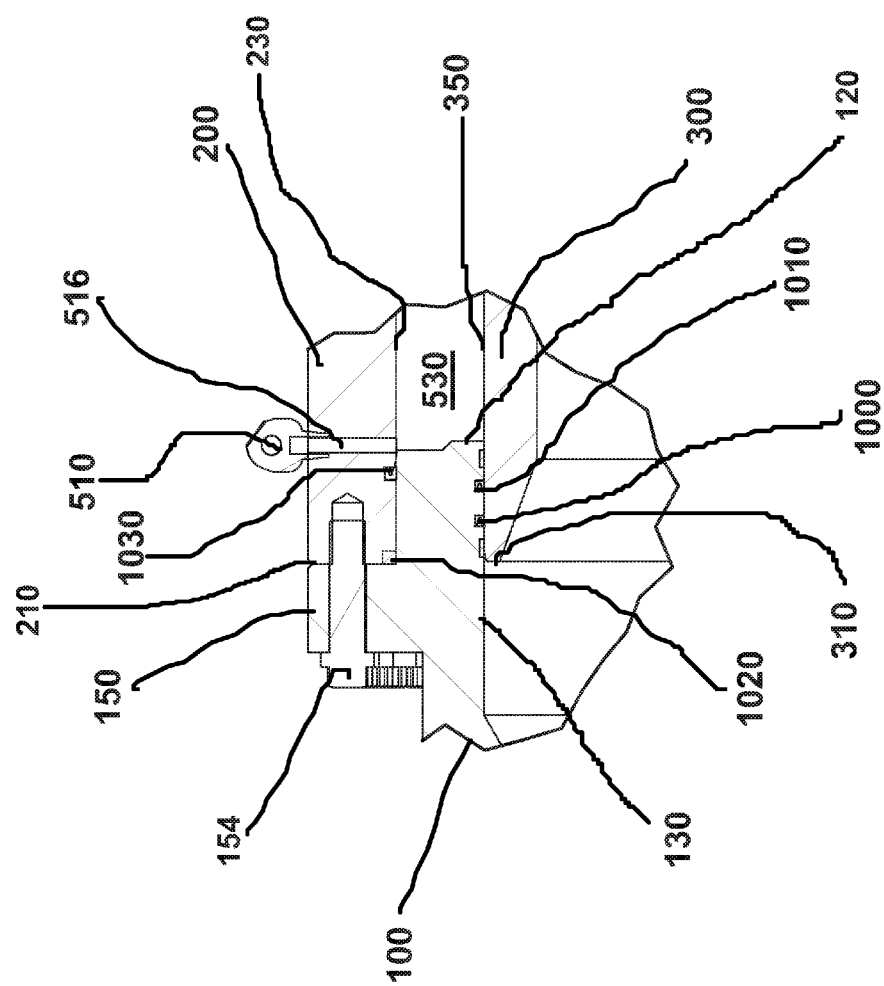
FIG. 9 is an enlarged sectional view of the left hand sealing system with the expandable/retractable device of FIG. 1 shown in a fully extended state.

As shown best in FIG. 9, seals 1000 and 1010 can seal between inner surface 130 of section 100 and second sliding surface 350 of section 300. Additionally, seals 1020 and 1030 can seal between first inner surface 230 of body 200 and section 100.

Body 200 can include first end 210 and second end 220. Body 200 can include a plurality of openings 212 which match with the plurality of openings 154 of connecting flange 150. Plurality of fasteners 214 can be used to connected body 200 to section 100. Body 200 can include first inner surface 230 and second inner surface 240. Connectable to second end 220 of body 200 can be ring seal retainer 250.

Ring seal retainer 250 can include a plurality of openings 222 which match with plurality of openings 252 for ring seal retainer 250. Plurality of fasteners 254 can be used to connect ring seal retainer 250 to second end 220 of body 200.

Figure 11:
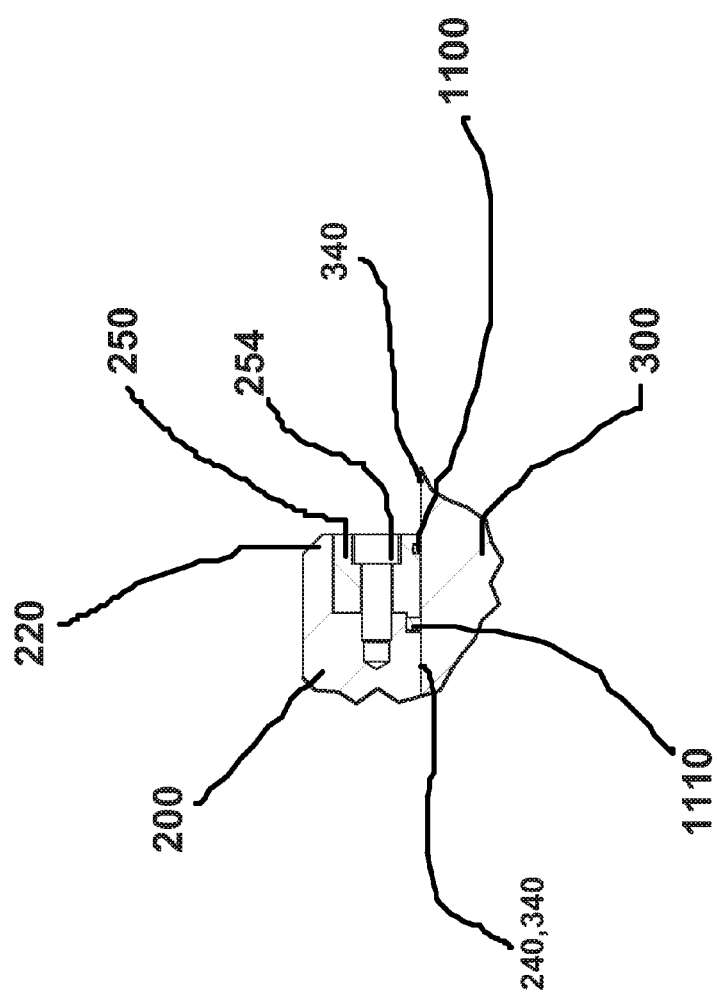
FIG. 11 is an enlarged sectional view of one of the threaded connectors of the sealing ring.

As shown best in FIG. 11, seals 1100 and 1110 can seal between second inner surface 240 of body 200 and first sliding surface 340 of section 300. Additionally, seal 1100 can seal between ring seal retainer ring 250 and first sliding surface 340.

Section 300 can include first end 310 and second end 320. On second end 320 can be a connecting member such as a connecting flange 322 having a plurality of openings 324. Between first end 310 and second end 320 can be bore 360. Section 300 can also include first sliding surface 340 and second sliding surface 350. First sliding surface 340 can slidingly and sealingly interact with interior surface 130 of section 100. Second sliding surface 350 can slidingly and sealingly interact with first inner surface 230 of body 200.

Lip seal retracting/extending section 400 can include first end 410, second end 420, and outer perimeter 430. Section 400 can also include a plurality of openings 402 to accommodating a plurality of fasteners 404.

Figure 10:
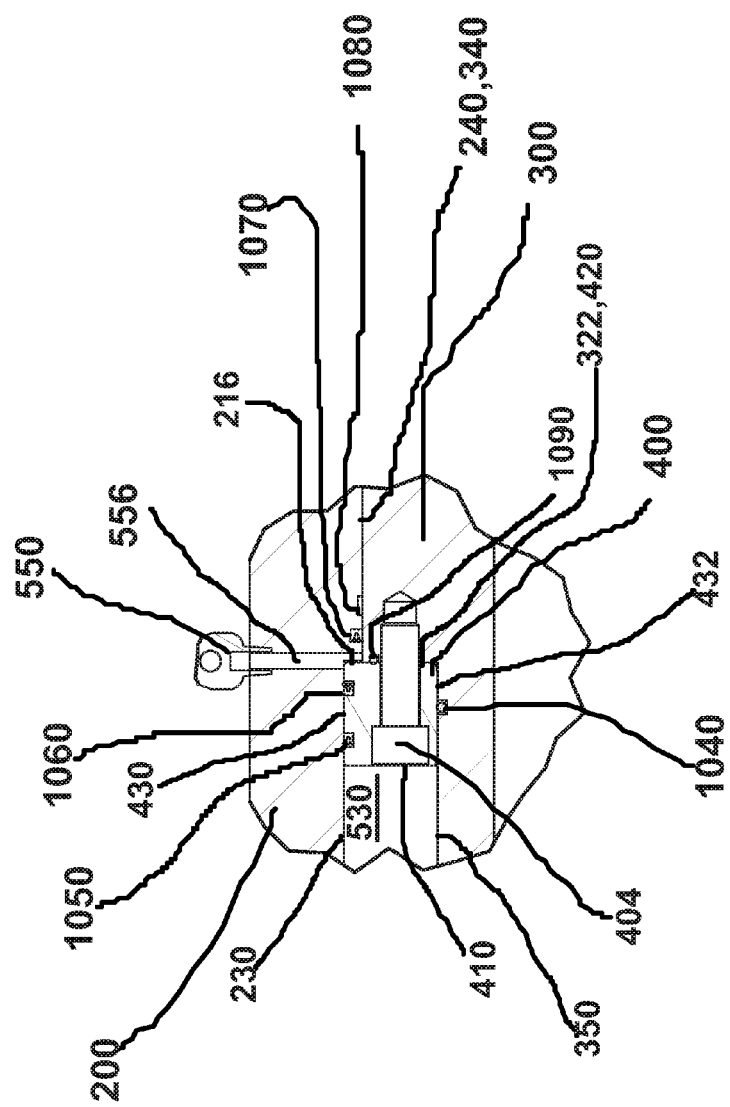
FIG. 10 is an enlarged sectional view of the right hand sealing system with the expandable/retractable device of FIG. 1 shown in a fully extended state.

As shown in FIG. 10, lip seal 400 can include seals 1050 and 1060 which can be conventionally available sealing materials such as o-ring type seals. Body 200 can include seals 1070 and 1080. Additionally, section 300 can include seals 1040 and 1090. Seals 1050 and 1060 can seal between outer perimeter surface 430 of sealing ring 400 and first inner surface 230 of body 200. Seal 1040 can seal between inner perimeter surface 432 of sealing ring 400 and second sliding surface 350 of section 300. Seal 1090 can seal between second end 420 of sealing ring and body 300.

When section 300 is slidingly connected to section 100, a first chamber 530 of varying volume is created between first inner surface 230, second end 120, second sliding surface 350, and first end 410.

Additionally, when section 300 is slidingly connected to section 100, a second chamber 540 of varying volume is created between second inner surface 340, second end 420, first interior surface 230, and shoulder 216.

Figure 4:
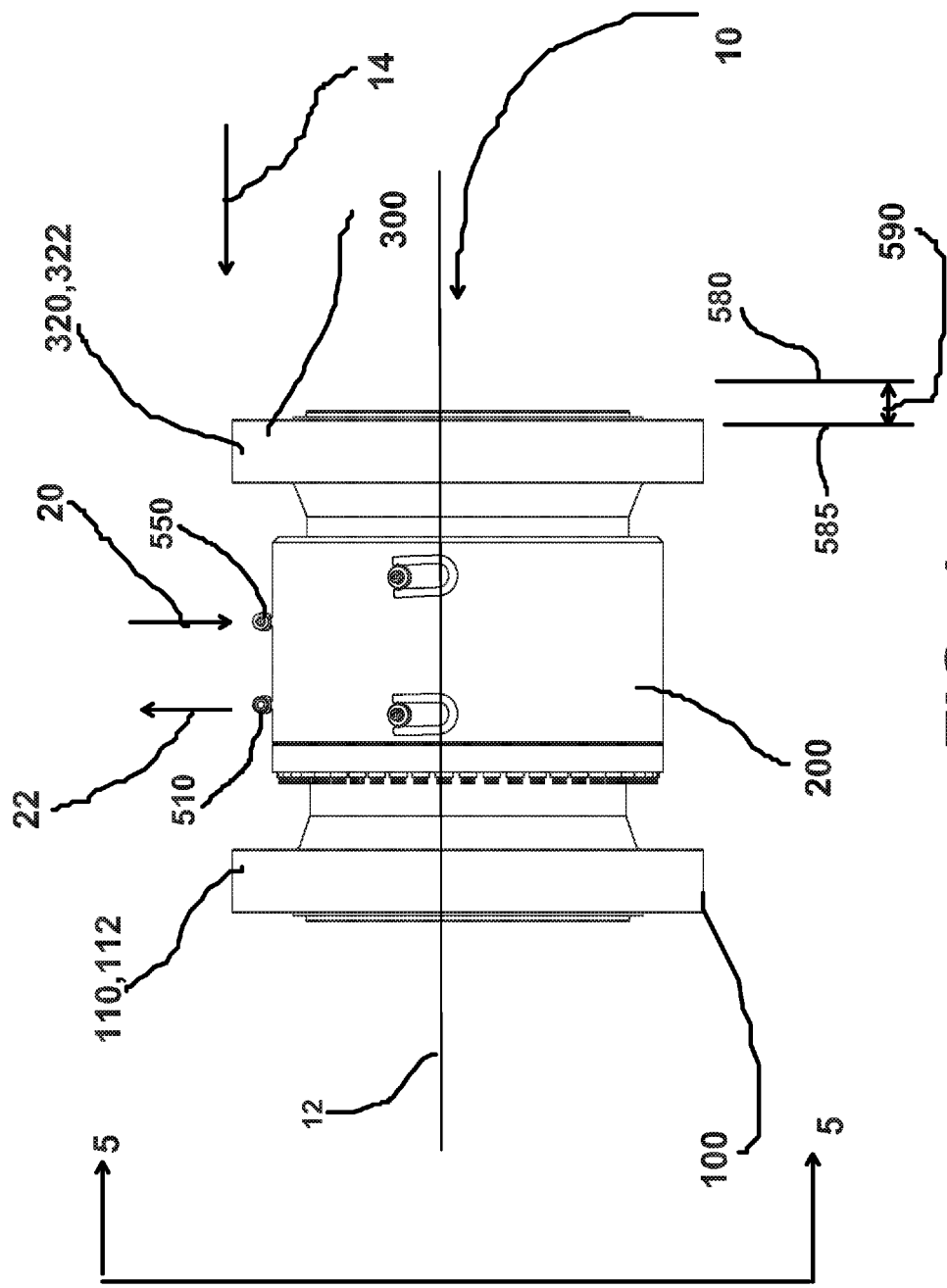
FIG. 4 is a side view of the expandable/retractable device shown in FIG. 1, shown in a retracted state.
Figure 5:
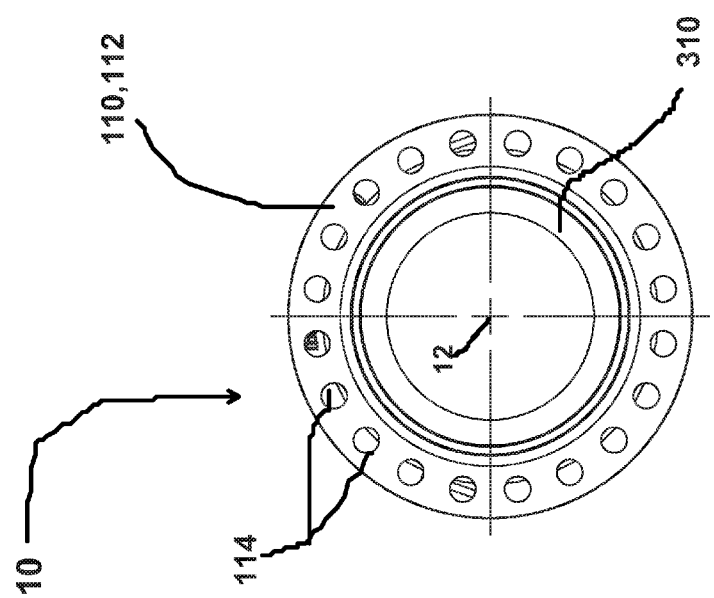
FIG. 5 is an end view of the expandable/retractable device taken from lines 5-5 of FIG. 4.
Figure 6:
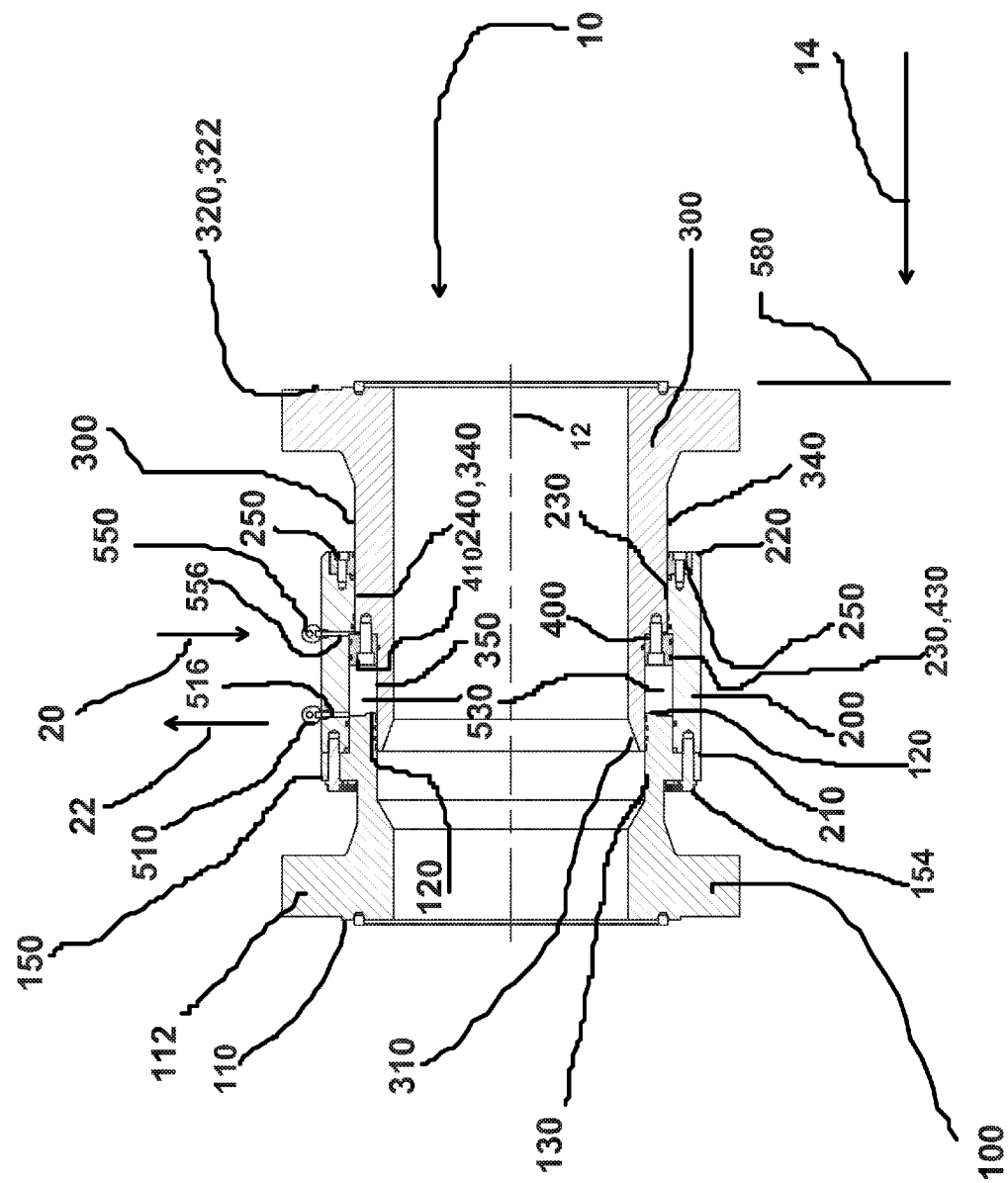
FIG. 6 is a side sectional view of the expandable/retractable device shown in FIG. 1, shown in an extended state.
Figure 7:
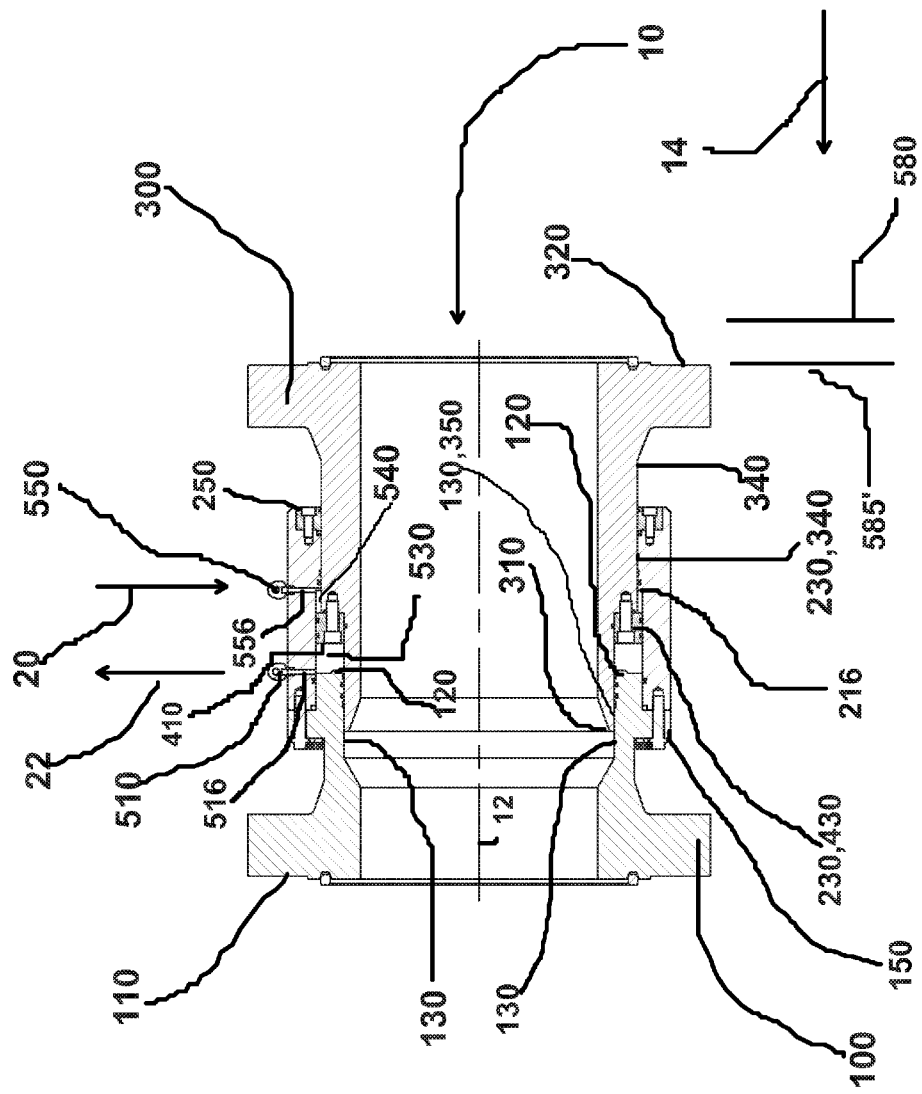
FIG. 7 is a side sectional view of the expandable/retractable device shown in FIG. 1, shown in a partially retracted state.
Figure 8:
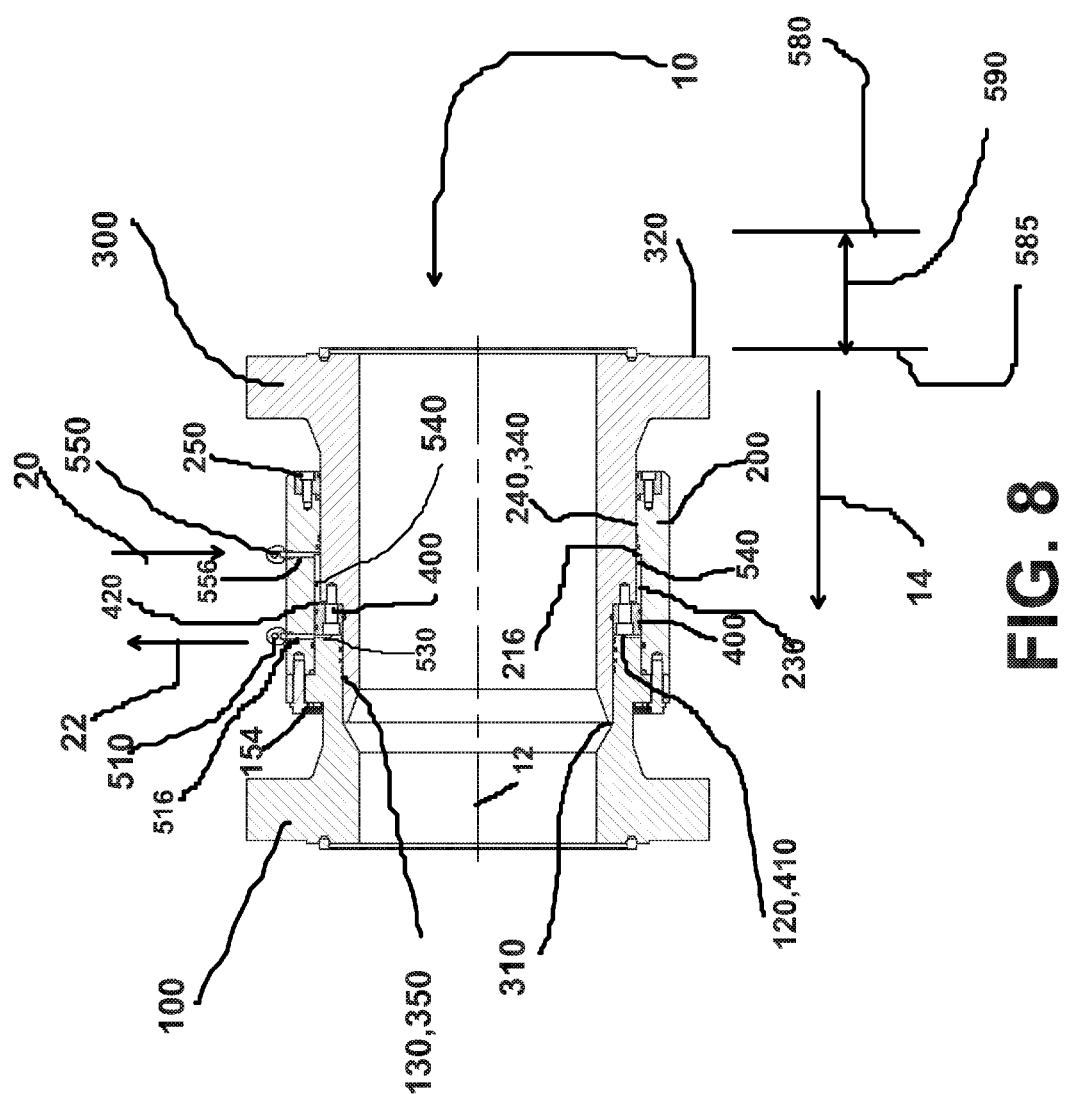
FIG. 8 is a side sectional view of the expandable/retractable device shown in FIG. 1, shown in a fully retracted state.

FIG. 3 is a side view of expandable/retractable device 10 shown in an extended state. FIG. 4 is a side view of expandable/retractable device 10 shown in a retracted state. FIG. 5 is an end view of the expandable/retractable device 10 taken from lines 5-5 of FIG. 4. FIGS. 6 through 8 schematically show the process of expandable/retractable device 10 changing from an extended to retracted state, or where section 300 slidably retracts into section 100.

Figure 20:
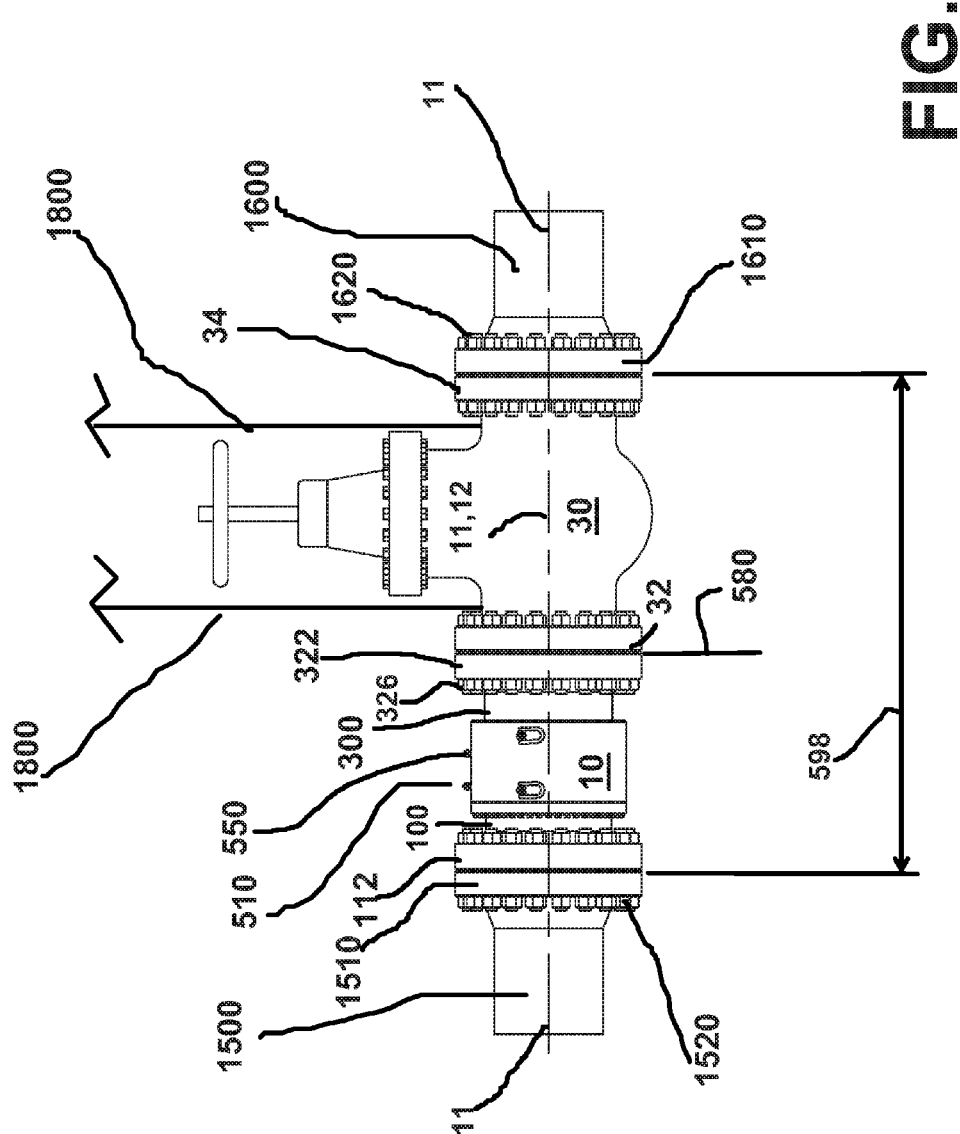
FIG. 20 is a side view of a valve attached to a piping system incorporating the telescoping unit of FIG. 1.
Figure 21:
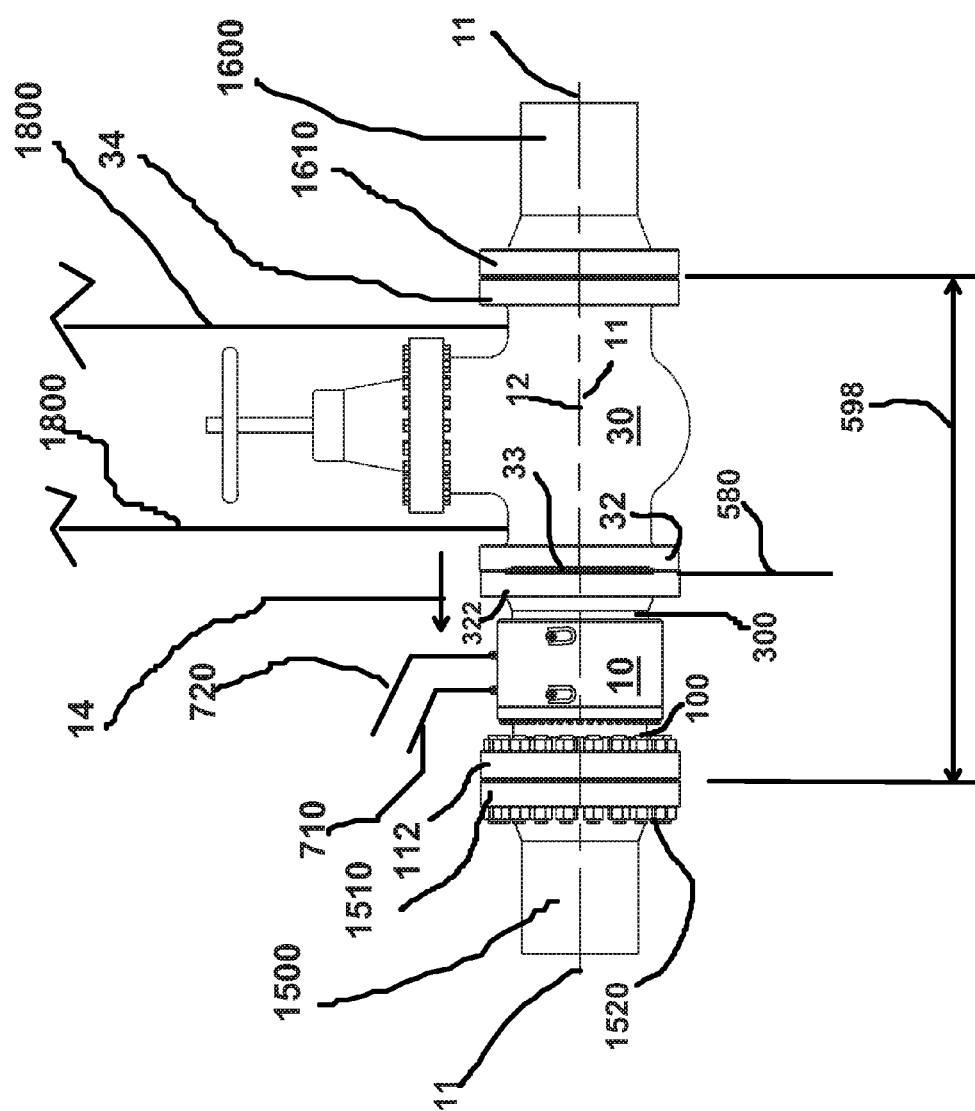
FIG. 21 is a side view of the valve and piping system of FIG. 20 with the threaded fasteners removed from both connecting flanges and fluid powered system connected to connectors.
Figure 22:
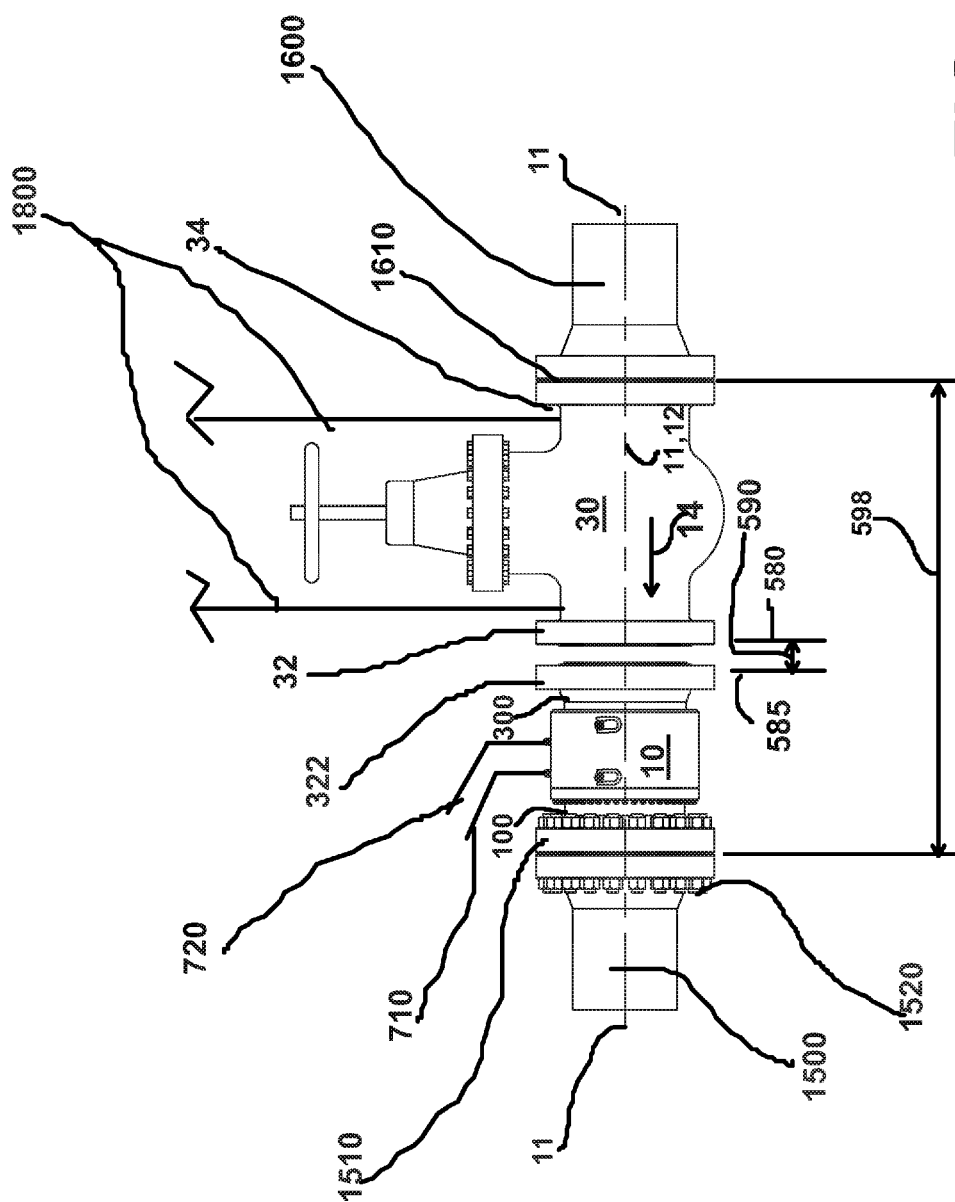
FIG. 22 shows the telescoping section now put in a retracted state.

FIGS. 20 through 27 schematically show one embodiment of a method and apparatus to remove a valve. FIG. 20 is a side view of a valve 30 attached to a piping system 1500, 1600 incorporating expandable/retractable device 10. FIG. 21 is a side view of the valve 30 and piping system 1500,1600 with the threaded fasteners 326 and 1620 removed from both connecting flanges (32 of valve 30 and 322 of unit 5 along with 34 of valve 30 and 1510 of piping 1600) and fluid powered system 5 connected to connectors 710 and 720. Here, because retraction is being done for unit 10 (flange 322 moved in the direction of arrow 14 in FIG. 21) fluid will enter second connector 550 and exit first connector 510). The process of retraction has been explained in connection with FIGS. 6 through 12. Valve support/relocation system 1800 can be connected to valve 30. In one embodiment valve support/relocation system 1800 can be a hoist, crane, fork lift, etc. FIG. 22 shows the telescoping section 10 now put in a retracted state with flange 322 being retracted (in the direction of arrow 14) from position 580 to position 585 creating a gap 590. In various embodiments position 585 does not need to be fully retracted, and merely a gap 590 need be created to provide a enough room to remove the packing between valve 30 and expandable/retractable device 10.

Figure 23:
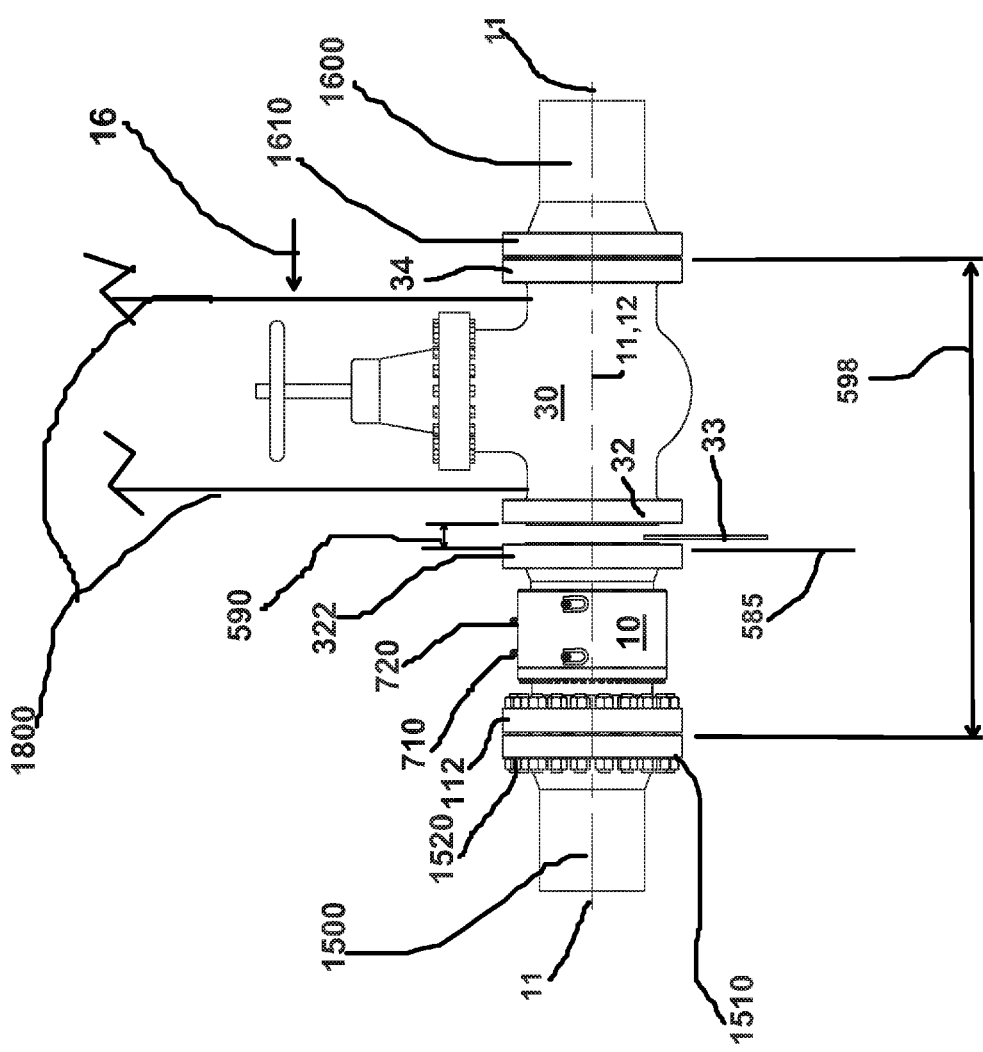
FIG. 23 shows a packing unit being removed from a gap created between the lefthand set of flanges.

FIG. 23 shows a sealing ring/packing unit 33 being removed from a gap 590 created between the lefthand set of flanges (322 and 32). Sealing ring/packing unit 33 is conventionally available for sealing between flanged connections. FIG. 24 is a perspective view of one embodiment of a sealing ring 33 that can be used to seal between the valve 30 and its nearest connection, this embodiment showing a sealing ring for a flange type connection. FIG. 25 is a sectional view of sealing ring 33 taken through the lines 25-25 of FIG. 24. Sealing ring can include first end 52, second end 54, and have a width or distance 56 between the first and second ends.

The process of retracting section 300 in relation to section 100 is essentially the opposite of the process of extension. FIG. 6 is a side sectional view of expandable/retractable device 10, shown in an extended state. In the extended state section 300 has been slidingly moved towards the right such that second end 320 is located as extended position 580. In order to move section 320 to the left (schematically indicated by arrow 14) a hydraulic fluid source can be fluidly connected to second connector 550 and fluid pumped in into port 556 (schematically indicated by arrow 20) into second chamber 540 which pushes on second end 420 of sealing ring 400 (best shown in FIG. 10). Because sealing ring 400 is connected to section 300 via plurality of fasteners 404, the fluid force on second end 420 of sealing ring 400 causes both sealing ring 400 and connected section 300 to retract (schematically indicated by arrow 14). FIG. 7 is a side sectional view of the expandable/retractable device 10 shown in a partially retracted state. Fluid has continued to be pumped into port 556 causing fluid to enter second chamber 540 and section 300 to continue to move to the left (schematically indicated by arrow 14) and causing second end 320 to move from position 580 to position 585'. FIG. 8 is a side sectional view of the expandable/retractable device 10, shown in a fully retracted state. Fluid has continued to be pumped into port 556 causing fluid to enter second chamber 540 and section 300 to continue to move to the left (schematically indicated by arrow 14) and causing second end 320 to move from partially retracted position 585' to fully retracted position 585. In the fully retracted position second end 120 of section 100 is in contact with first end 410 of perimeter sealing ring 400. The total amount of retraction from position 580 to position 585 is schematically indicated by gap 590. During any of the steps of retraction first connector 510 can be connected to a fluid retrieval system to collect any fluid located in first chamber 530 which fluid will exit first chamber 530 (as sealing ring 400 moves in the direction of arrow 14) through port 516.

FIG. 9 is an enlarged sectional view of the left hand sealing system with the expandable/retractable device 10 shown in a fully extended state. Sealing between the inner surface 130 of fixed section or pipe spool 100 and the second sliding surface 350 of retracting/extending spool 300 can be affected using seals 1000,1010 which are located in annuluses. Sealing between fixed section or spool 100 and the first inner surface 230 of body 200 can be affected by seal 1030 located in an annulus. Seal 1020 can also be provided. Fixed section or spool 100 can be connected to body 200 via a plurality of threaded fasteners.

FIG. 10 is an enlarged sectional view of the right hand sealing system with the expandable/retractable device 10 shown in a fully extended state. Sealing ring 400 can be connected to retracting/extending spool 300 via a plurality of fasteners 404. Sealing between second inner surface 240 of body 200 and first sliding surface 340 of retracting/extending spool 300 can be affected by seals 1070 and 1080 located in annuluses. Sealing between outer perimeter 430 of lip seal ring 400 and first inner surface 230 of body 200 can be affected by seals 1050 and 1060 located in an annuluses. Sealing between inner perimeter 432 of lip seal ring 400 and second sliding surface 350 of retracting/extending spool 300 can be affected by seal 1030 located in an annulus.

FIG. 11 is an enlarged sectional view of one of the connection between ring seal retainer 250 and body 200. Ring seal retainer 250 can be connected to body 200 via a plurality of fasteners 254. Sealing between outer perimeter 430 of lip seal ring 400 and first inner surface 230 of body 200 can be affected by seals 1050 and 1060 located in an annuluses. Sealing between ring seal retainer 250 and first sliding surface 340 of retracting/extending spool 300 can be affected by seal 1100 located in an annulus. Another seal 1110 can be provided between inner surface 240 of body 200 and first sliding surface 340 of retracting/extending spool 300.

Figure 12:
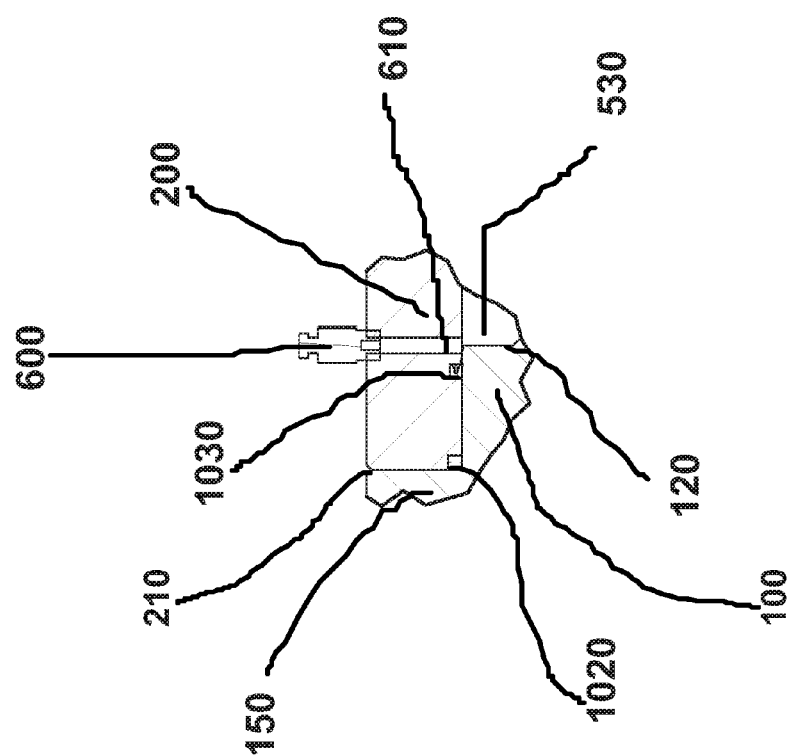
FIG. 12 is an enlarged sectional view of a venting port and system.

FIG. 12 is an enlarged sectional view of a venting port and system. Venting port system can comprise port 610 and vent 600. Port 610 can be fluidly connected to first chamber 530. In the event that the pressure inside first chamber 530 raises above a desired level vent 600 can open allowing fluid to exit chamber 530 via port 610. Such venting can protect the components around first chamber 530 from seeing excessive pressure.

Figure 26:
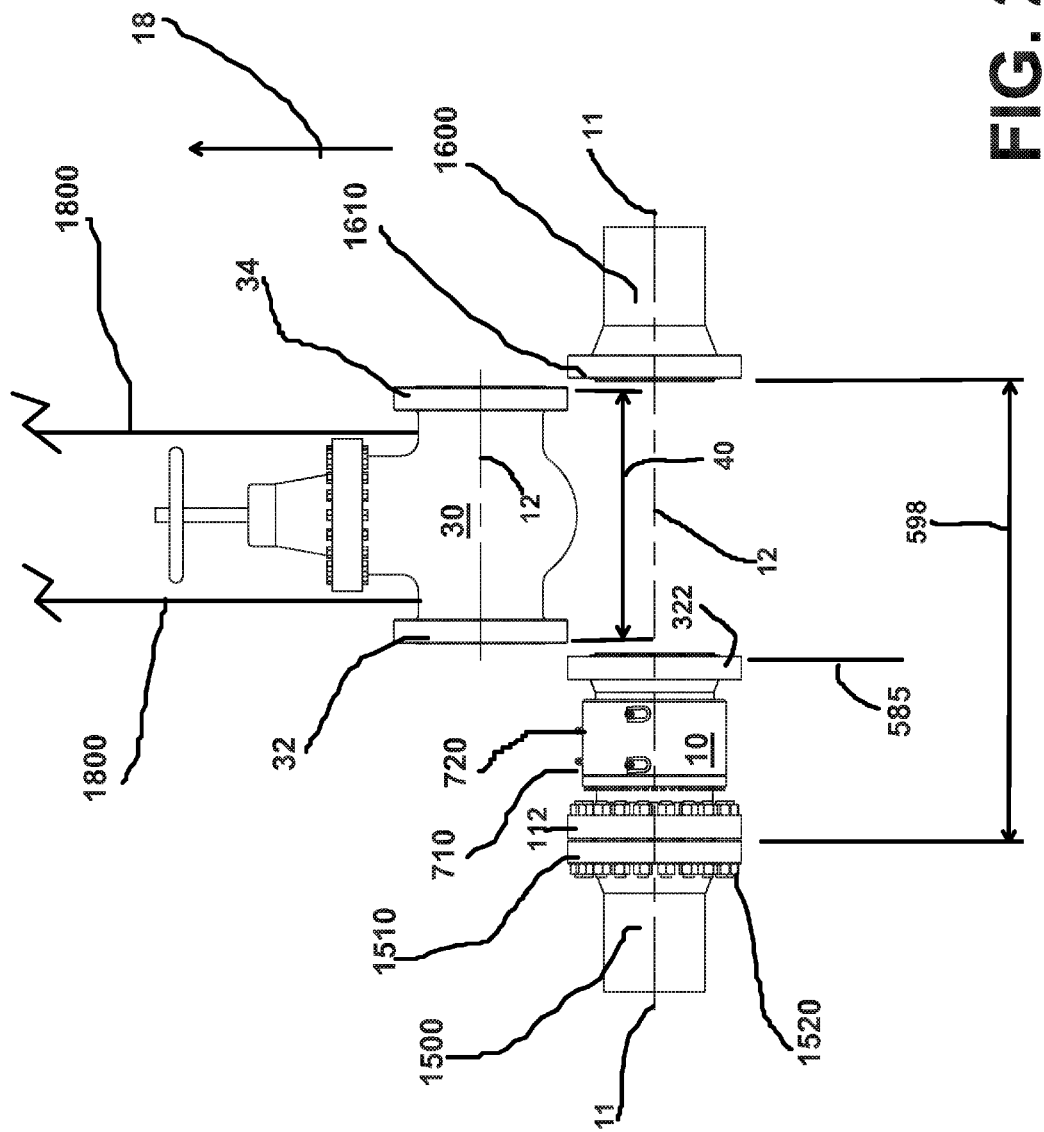
FIG. 26 shows the now detached valve being removed from the piping system.
Figure 27:
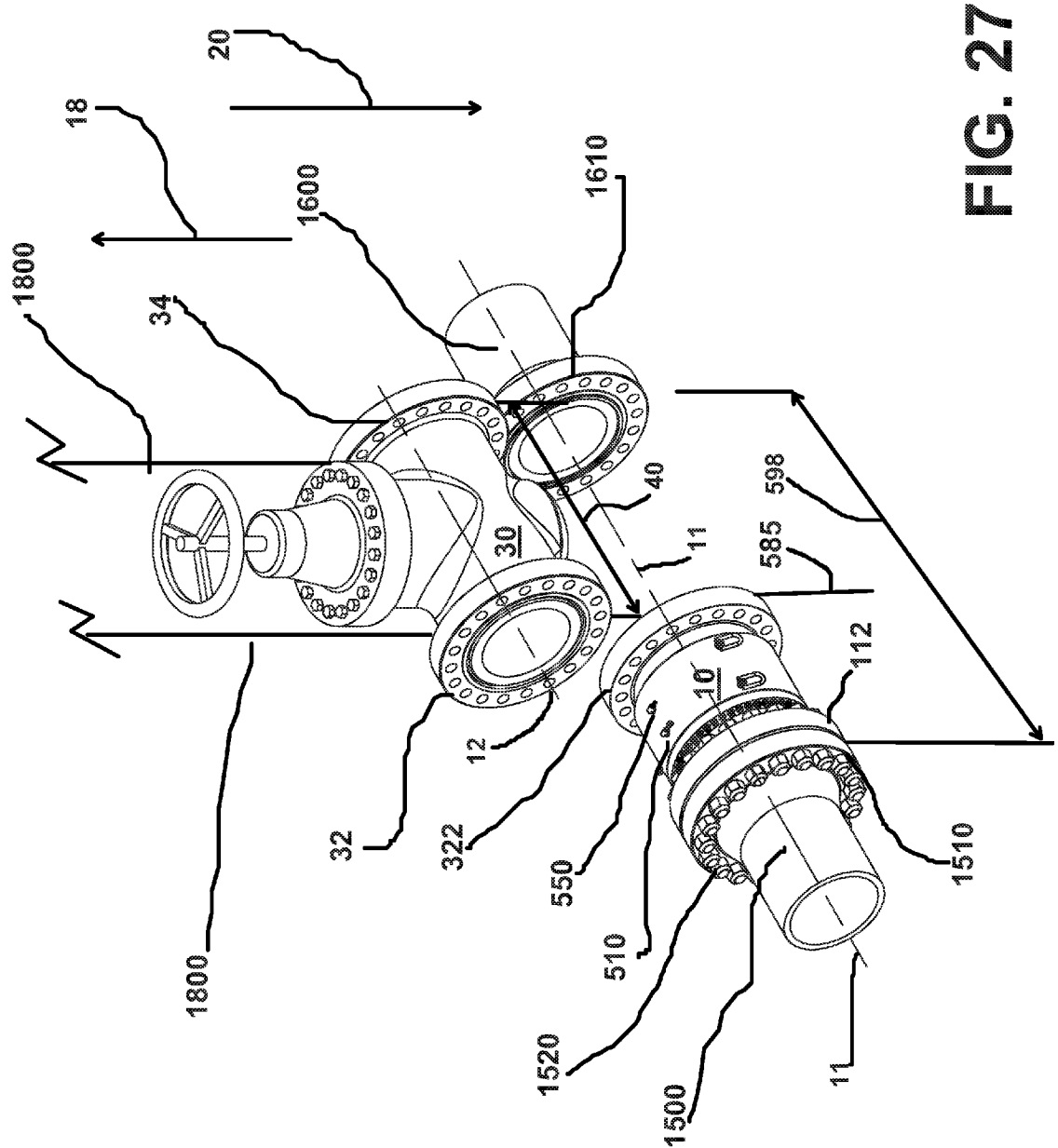
FIG. 27 is a perspective view showing the now detached valve being removed from the piping system, and alternatively being installed in the piping system.

In one embodiment the next step is includes moving valve 30 in the direction of arrow 16, such as by using lifting/moving device 1800, while maintaining a substantially constant vertical height for valve 30, creating a gap between the right hand set of flanges (34 and 1610), and removing the packing between this set of flanges. Maintaining a constant vertical height of valve 30 minimizes the risk of damage to valve 30, piping unit 1600, and/or any components of the packing that may be desired to be reused when valve 30 is re-installed. FIGS. 26 and 27 show the now detached valve 30 being removed from the piping system (schematically indicated by vertical arrow 18).

In prior art systems, especially in confined space type pipe spool systems, merely removing the connectors detachably connected the valve to the pipe spool pieces does not allow the valve to be removed from its position between the pipe spool pieces without risking damage to the valve, sealing components, and/or pipe spool pieces. In various embodiments moving the valve away from its position between the pipe spool piece envision the case where the longitudinal axis of the valve is moved away from a position where its longitudinal axis is coincident with the longitudinal axis of the pipe spool pieces to a position where its longitudinal axis is spaced apart from the longitudinal axis of the pipe spool pieces. Risk of damage to the valve, sealing components, and/or pipe spool pieces arises because typically sealing rings used to affect a seal between the connections between the valve and pipe spool pieces have a width or thickness which is not flexible enough to bend or be squeezed between the valve and pipe spool pieces such as when the valve is attempted to be moved in a lateral direction relative to the pipe spool pieces' longitudinal axis. In prior art cases, in order to safely remove a valve 30 from between two pipe spool pieces without causing damage to the valve, sealing components, and/or pipe spool pieces, it is necessary to relocate, move, and/or remove all or part of at least one of the pipe spool pieces to provide a sufficient space between the connecting components of the valve and pipe spool pieces to allow removal of the sealing components and/or circumlocution around such sealing components.

Figure 13:
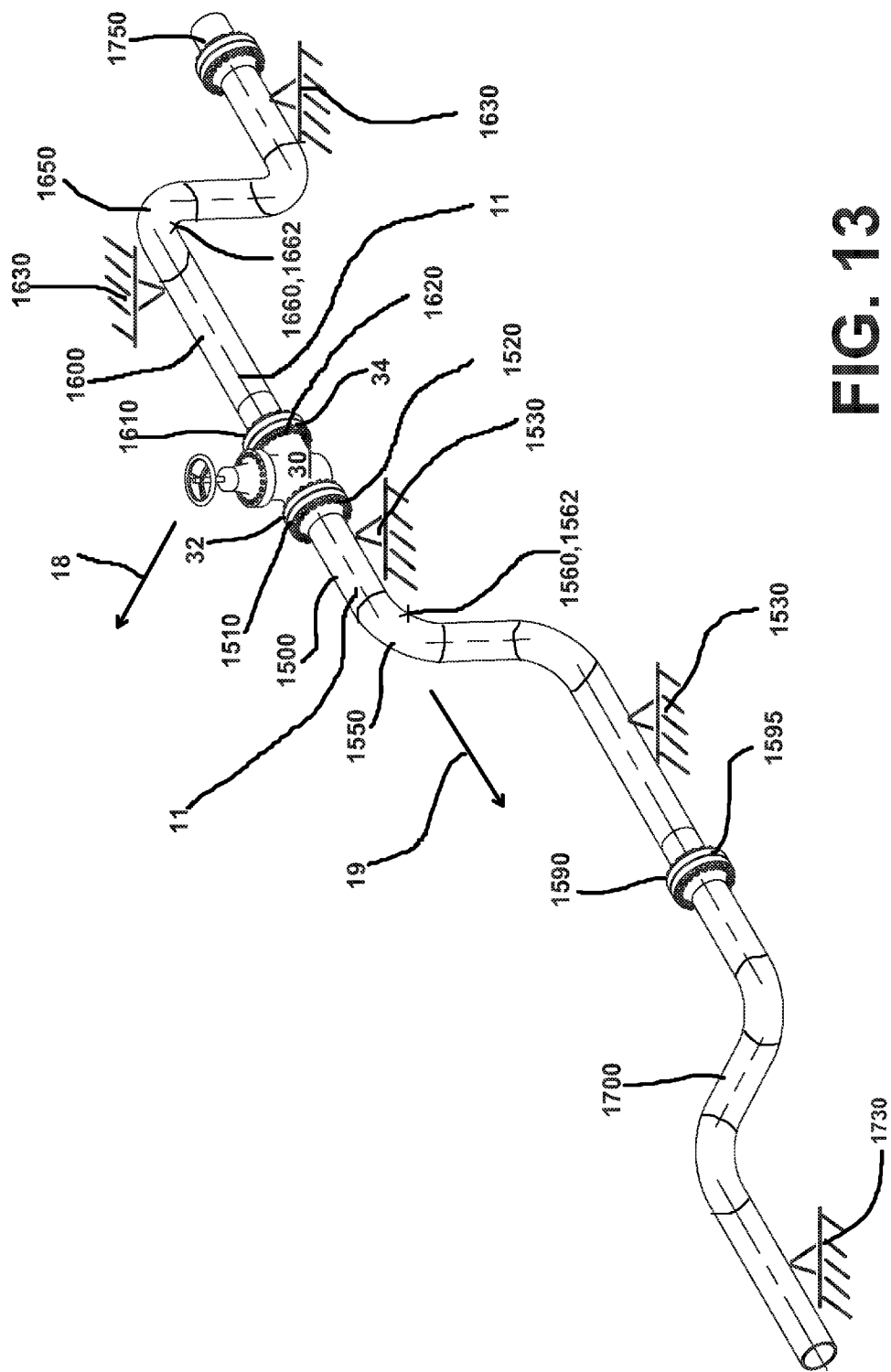
FIG. 13 is a perspective view of a prior art system of pipe spools with a valve connected by flanges between two pipe spool pieces.

FIG. 13 is a perspective view of a prior art system of pipe spools 1700,1500,1600, and 1750 with a valve 30 connected by flanges between two pipe spool pieces 1500,1600. Even after removal of the plurality of threaded fasteners 1520 and 1620, an internally located sealing ring 33 (between flanges 1510 and 32) having a width or depth 56 along with a second internally located sealing ring 33' (between flanges 1610 and 34) would resist movement of valve 30 laterally from longitudinal axis 11, such as in the direction of arrow 18.

Figure 14:
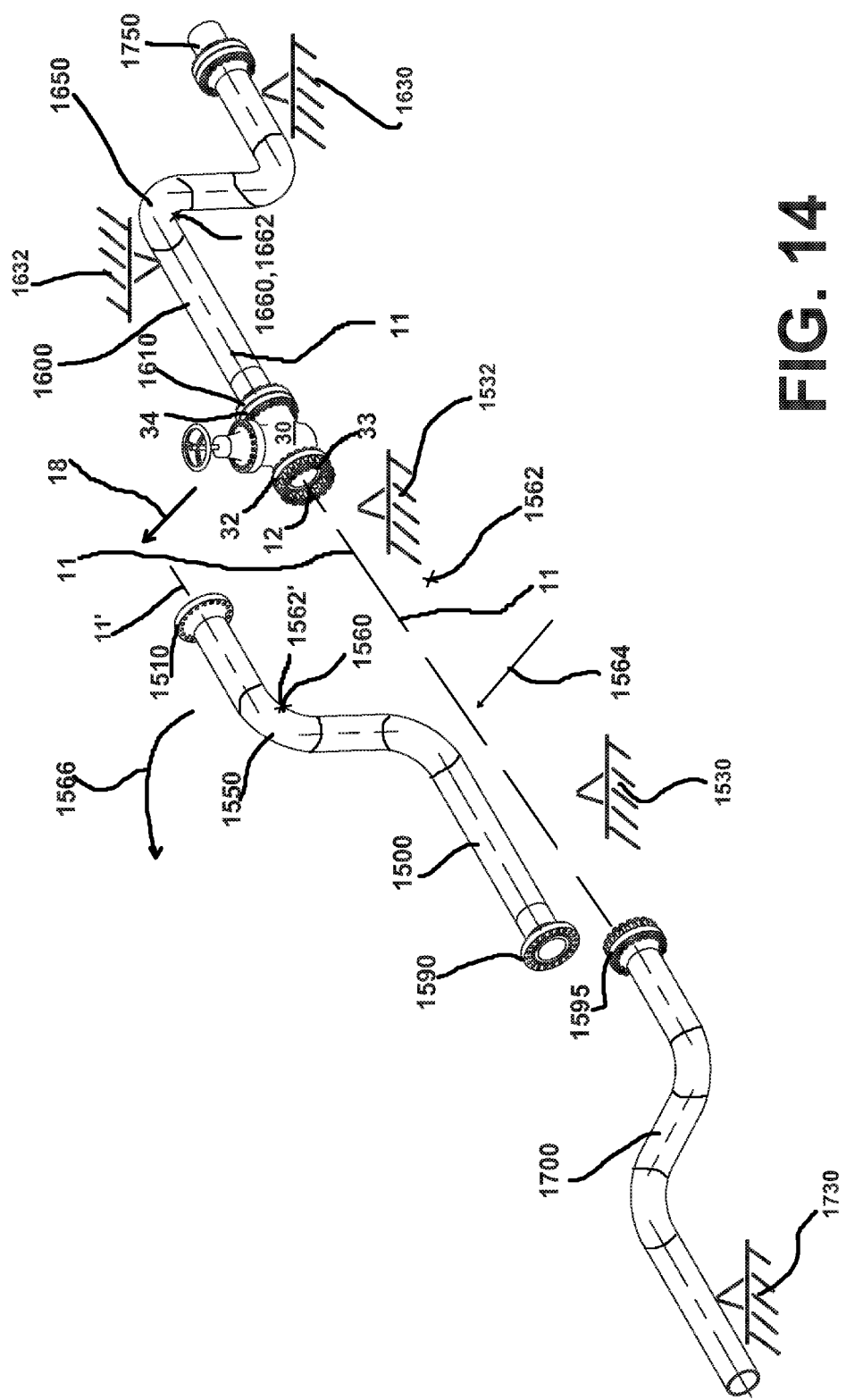
FIG. 14 is the prior art system of pipe spools with a valve connected by flanges between two pipe spool pieces of FIG. 13, wherein one of the pipe spool pieces has been moved to provide a gap to remove the valve.

Instead, relocation and/or removal of all or part of at least one of the pipe spool pieces 1500, 1600 is required to provide a sufficient gap between the connecting components of valve 30 (internally located sealing ring 33 between flanges 1510 and 32, having a width or depth 56, and second internally located sealing ring 33' between flanges 1610 and 34 having a width or depth 56') and pipe spool pieces 1500,1600 to allow removal of the sealing components (sealing ring 33 and/or 33') and/or circumlocution around such sealing components. FIG. 14 shows the prior art system of pipe spools wherein one of the pipe spool pieces 1500 has been moved to provide a gap to remove valve 30. Arrow 1566 schematically indicates the movement of pipe spool piece 1600 from its original position. On the closest weld fitting 1550 a point 1560 has been moved from its original position 1562 to its relocated position 1562' in FIG. 14. Arrow 1564 schematically represents the movement of fixed point 1560 of pipe weld 1550 from original 1562 to moved position 1562'. In FIG. 14 it can be seen that the moved pipe spool piece 1500 now has a longitudinal axis 11' which is no longer coincident with the longitudinal axis 11 of pipe spool piece 1600 and the longitudinal axis 12 of valve 30 (although longitudinal axis 11 of pipe spool piece 1600 does remain coincident with longitudinal axis 12 of valve 30). Additionally, comparing FIGS. 13 and 14, it can be seen that two pipe spool connectors/supports 1530,1532 both were required to be disconnected to allow movement of pipe spool piece 1500 to its position shown in FIG. 14. It is extremely time consuming and expensive to remove an entire pipe spool piece (such as 1500 and/or 1600) to provide the gap to remove sealing ring 33. In such a case a second connection between pipe spool piece 1500 and pipe spool piece 1700 may have to be disconnected removing plurality of threaded fasteners 1595. Additionally, removal of threaded fasteners can require the internal sealing component to be repaired. Also additionally, before moving pipe spool piece 1500 various supports 1530,1532, collars, slips, braces, etc. may also have to be disconnected all of which increases the time of rebuild. In some case one of the connecting pipe spool pieces can be disconnected at the valve 30 connection and the pipe spool "pulled away" from the valve 30 without disconnecting the pipe spool from its adjacent pipe spool. In FIG. 13 this event could occur where plurality of fasteners 1520 are removed and pipe spool piece 1500 pulled on (such as in the direction of arrow 19 to create a gap between flange 1510 and flange 32. Beyond the inherent dangers of pulling on pipe spool piece 1500 (which can deform/fracture such pipe spool piece), many times in confined spaces obtaining proper leverage and space to make the pull is difficult or impracticable. Without disconnecting, moving, and/or bending one or both of the connecting pipe spool pieces 1500,1600, the expandable/retractable device 11 enables the creation of a gap 590 to allow sufficient space to remove valve 30 from its connecting pipe spool pieces 1500,1600.

In one embodiment to remove, repair, refurbish, replace, and/or install valve 30, gap 590 can be created without relocating, moving, and/or removing all or part of at least one of the pipe spool pieces 1500,1600, where gap 590 provides sufficient space between the connecting components of the valve 30 and pipe spool pieces 1500,1600 to remove valve 30, such as by allowing removal of the sealing components (e.g., sealing ring 33 between flanges 1510,32 and/or sealing ring 33' between flanges 34,1610) and/or circumlocution around such sealing components. Additionally, as seen in FIG. 14 all connectors/supports can be left along/ignored when creating gap 590 (supports/connectors 1530,1532 remain on pipe spool piece 1500 and supports 1630,1632 remain on pipe spool piece 1600).

In one embodiment to remove, repair, refurbish, replace, and/or install valve 30, gap 590 can be created without moving the closest weld elbow in the connecting pipe spool pieces (e.g. weld elbow 1550 and/or weld elbow 1650) to provide sufficient space between the connecting components of the valve 30 and pipe spool pieces 1500,1600 where gap 590 provides sufficient space between the connecting components of the valve 30 and pipe spool pieces 1500,1600 to remove valve 30, such as by allowing removal of the sealing components (e.g., sealing ring 33 between flanges 1510,32 and/or sealing ring 33' between flanges 34,1610) and/or circumlocution around such sealing components.

In one embodiment to remove and/or install valve 30, gap 590 can be created while a point on an adjacent weld elbow in the connecting pipe spool pieces (e.g. point 1560 on weld elbow 1550 and/or point 1660 on weld elbow 1650) remains stationary in three dimensional space in creating gap 590 (e.g., point 1560 remains at space point 1562 and/or point 1660 remains at space point 1662 during gap creation) to provide sufficient space between the connecting components of the valve 30 and pipe spool pieces 1500,1600 where gap 590 provides sufficient space between the connecting components of the valve 30 and pipe spool pieces 1500,1600 to remove valve 30, such as by allowing removal of the sealing components (e.g., sealing ring 33 between flanges 1510,32 and/or sealing ring 33' between flanges 34,1610) and/or circumlocution around such sealing components.

In one embodiment to remove, repair, refurbish, replace, and/or install valve 30, gap 590 can be created during a time period when the longitudinal axis 12 of valve 30 remains coincident with the longitudinal axis 11 of the connecting pipe spool pieces 1500,1600.

In one embodiment to remove, repair, refurbish, replace, and/or install valve 30, gap 590 can be created without cutting connecting pipe spool piece 1500 and/or pipe spool piece 1600 which cut pipe spool pieces will later have to be reattached to the cut portions by welding or other connecting means.

In one embodiment to remove, repair, refurbish, replace, and/or install valve 30, gap 590 can be created without removing one or more supports to connecting pipe spool piece 1500 and/or pipe spool piece 1600 which supports (e.g., supports 1530 for pipe spool piece 1500 and/or supports 1630 for pipe spool piece 1600) will later be reattached to pipe spool pieces 1500 and/or 1600.

Figure 19:
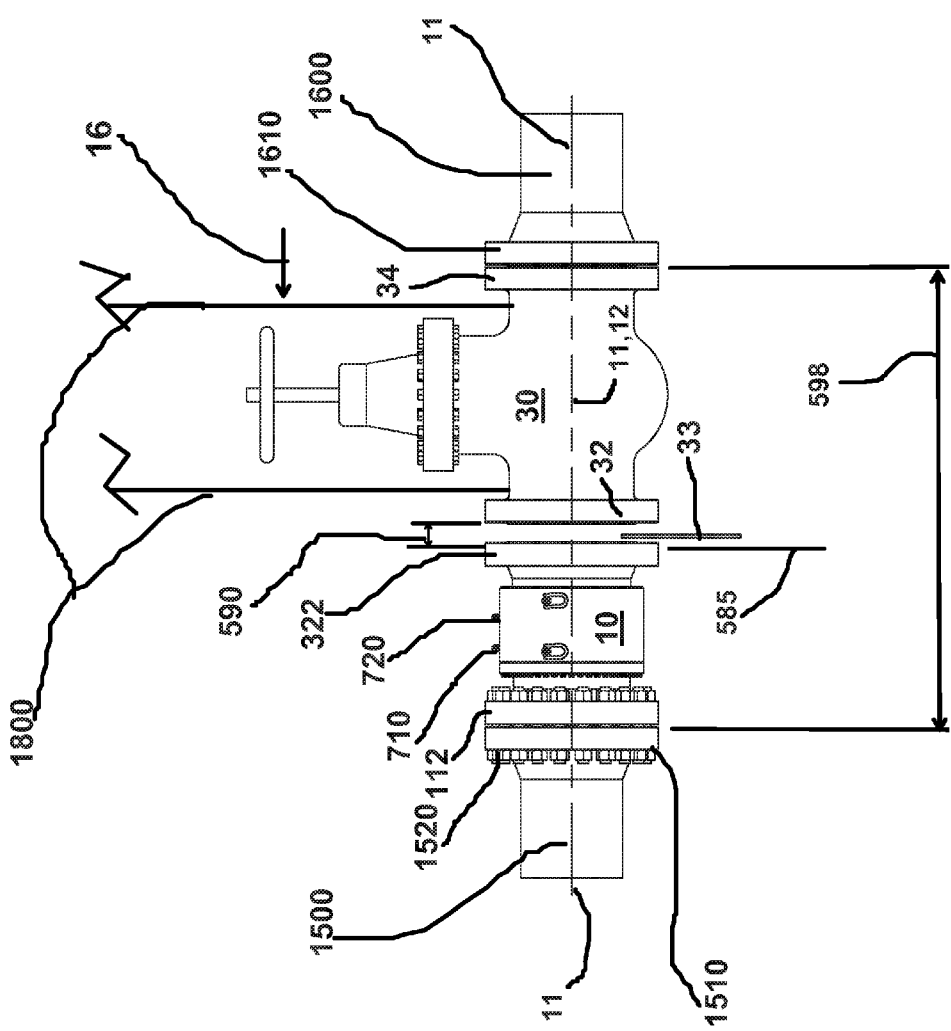
FIG. 19 is a enlarged side view of the gap created between the valve and pipe spool pieces of FIG. 17, and schematically showing a sealing ring being removed from the gap.

FIGS. 15 through 19 schematically illustrate the operation of one embodiment of expandable retractable device 10 to create a gap 590 to remove, repair, refurbish, replace, and/or install valve 30. FIG. 15 is a perspective view of one embodiment of the expandable/retractable device 10 connecting a valve 30 connected by flanges between two pipe spool pieces 1500,1600. FIG. 16 is an enlarged perspective view of the connections between valve 30 and pipe spool pieces 1500,1600. FIG. 17 is a perspective view of expandable/retractable device 10 creating a gap 590 between valve 30 and pipe spool pieces 1500,1600 without disconnecting, moving, and/or bending either connecting pipe spool piece 1500,1600. FIG. 18 is an enlarged perspective view of the gap 590 created between the valve 30 and pipe spool pieces 1500,1600. FIG. 19 is a enlarged side view of the gap 590 created between the valve 30 and pipe spool pieces 1500, 1600, and schematically showing a sealing ring 33 being removed from the gap 590.

Figure 28:
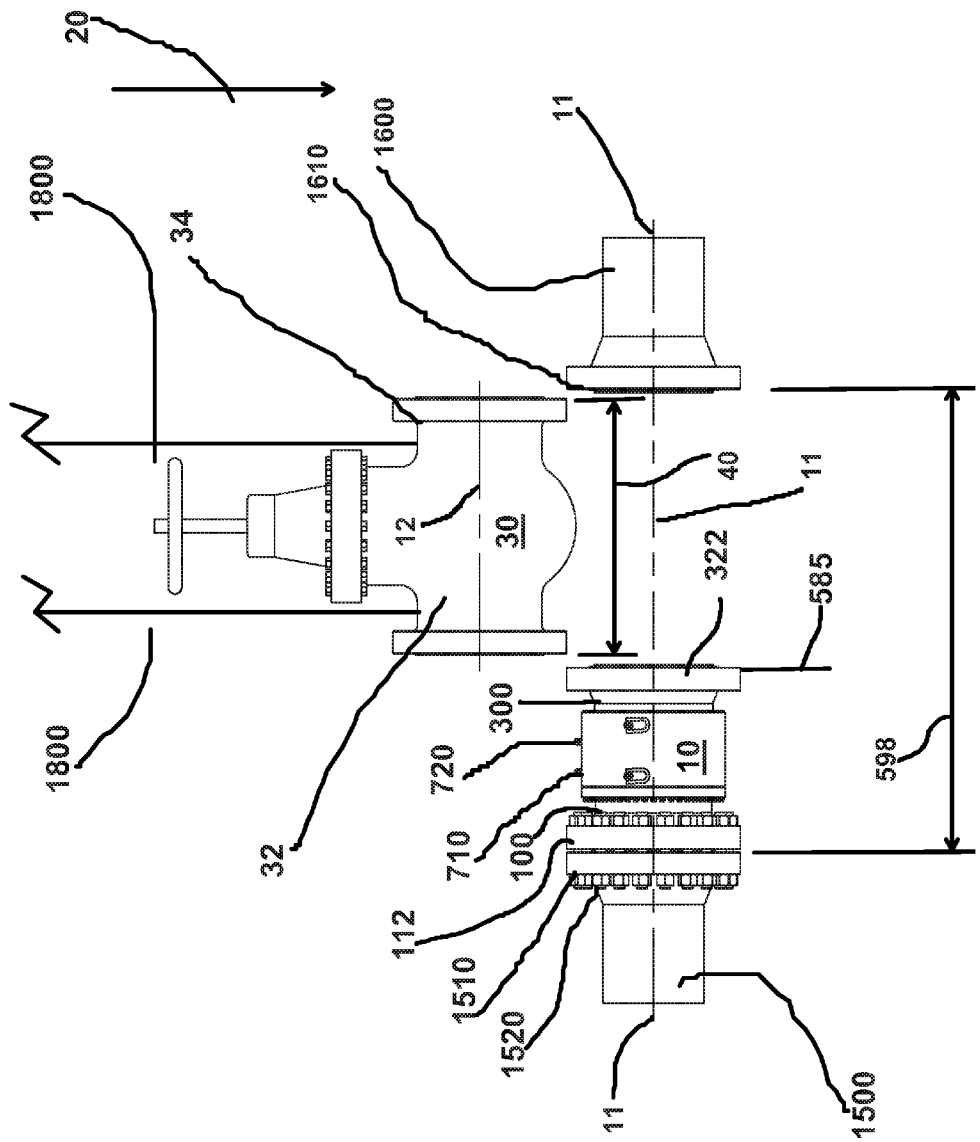
FIG. 28 shows a side view of a valve being positioned between two piping sections of a piping system including the expandable/retractable device of FIG. 1, with the expandable/retractable device being in a retracted state.
Figure 29:
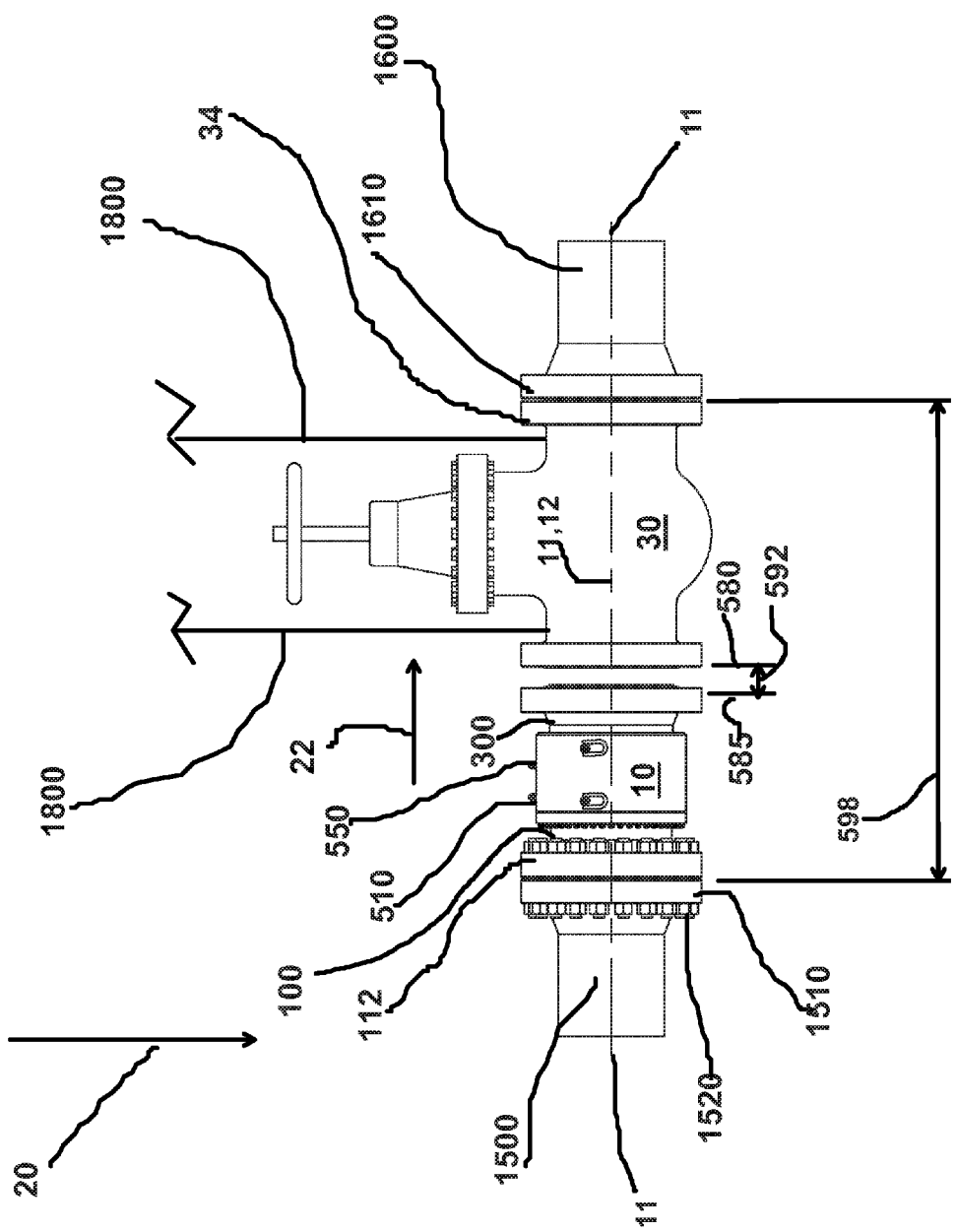
FIG. 29 shows a side view of the valve now positioned between two piping sections of a piping system including the expandable/retractable device of FIG. 1, with the expandable/retractable device being in a retracted state.
Figure 30:
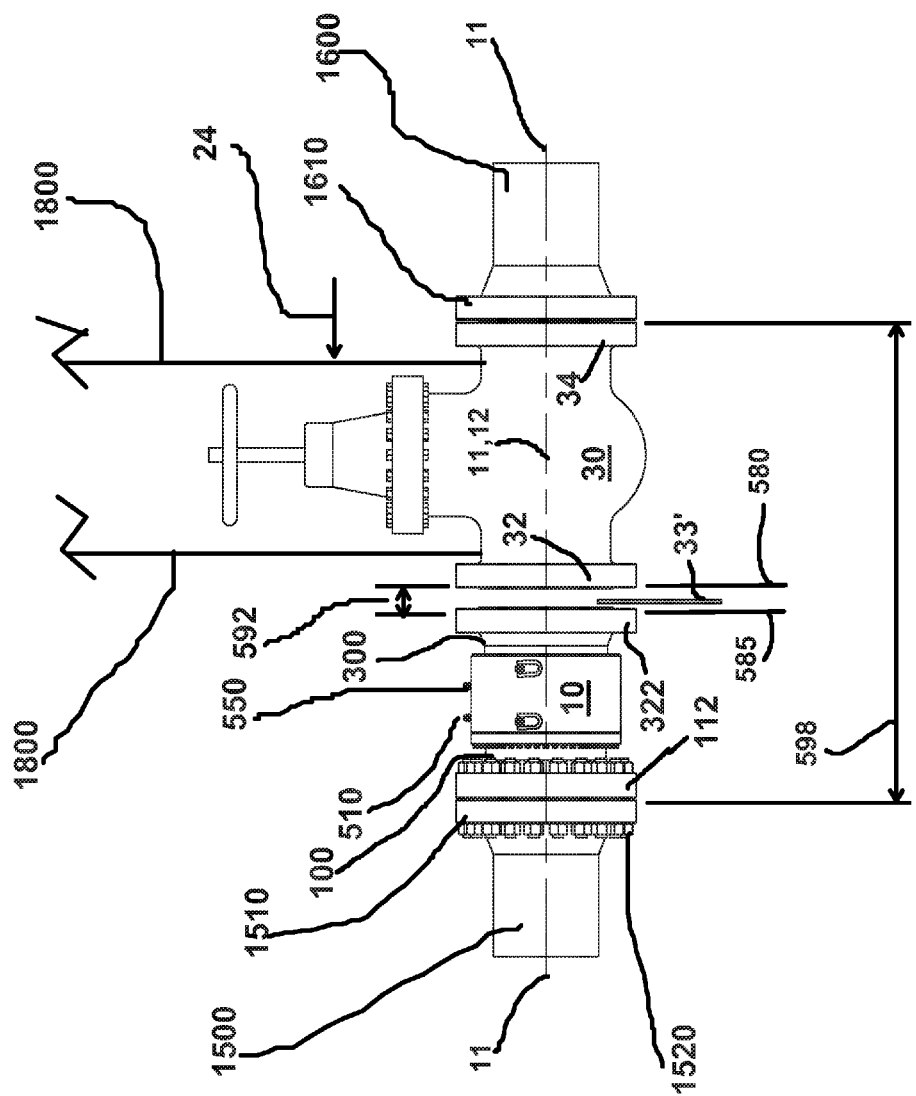
FIG. 30 shows a side view of the valve now positioned between two piping sections of a piping system including the expandable/retractable device of FIG. 1, and with a sealing ring being positioned in the gap between the two left set of flanges.
Figure 31:
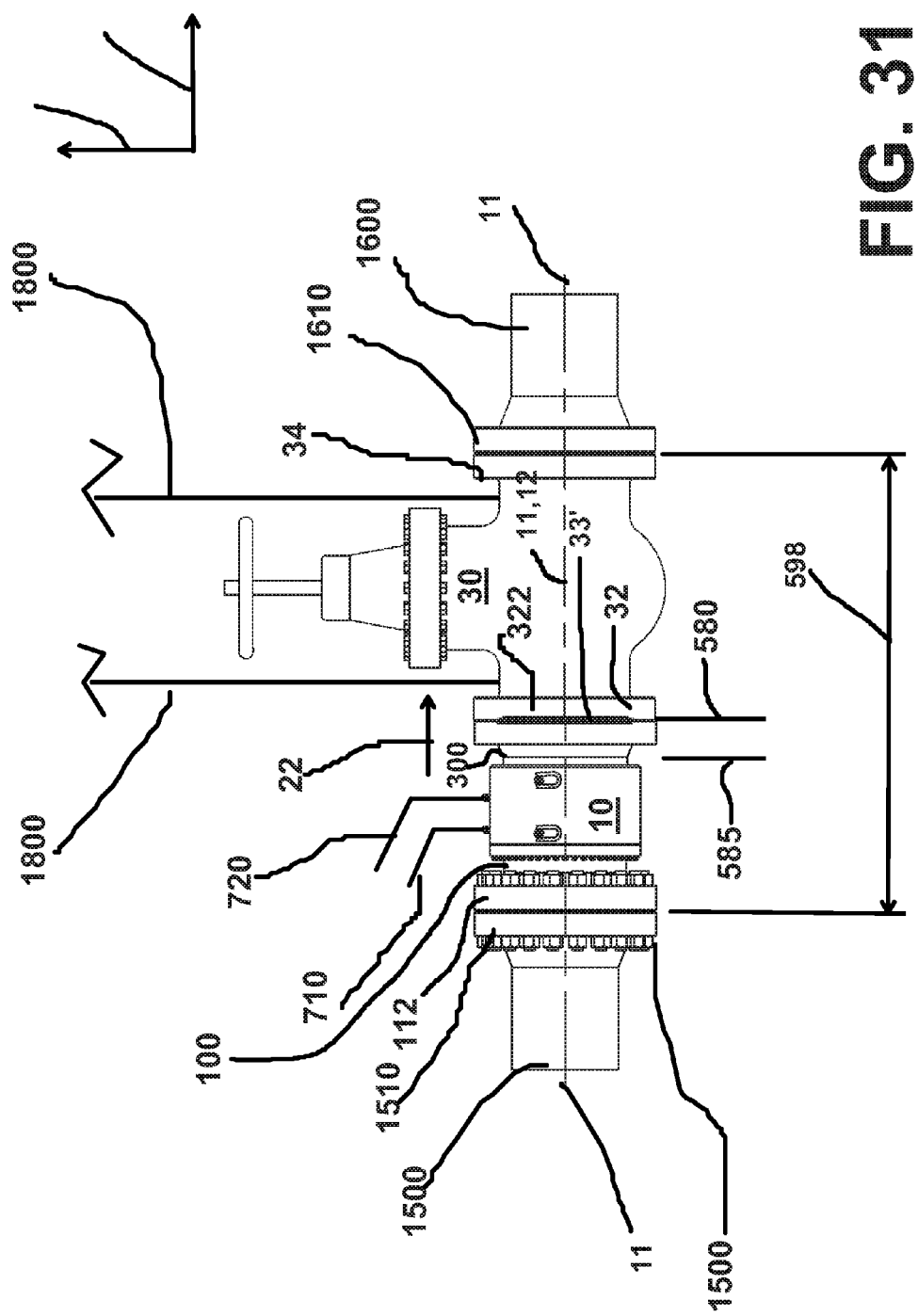
FIG. 31 shows the expandable/retractable device now being put in an extended state.
Figure 33:
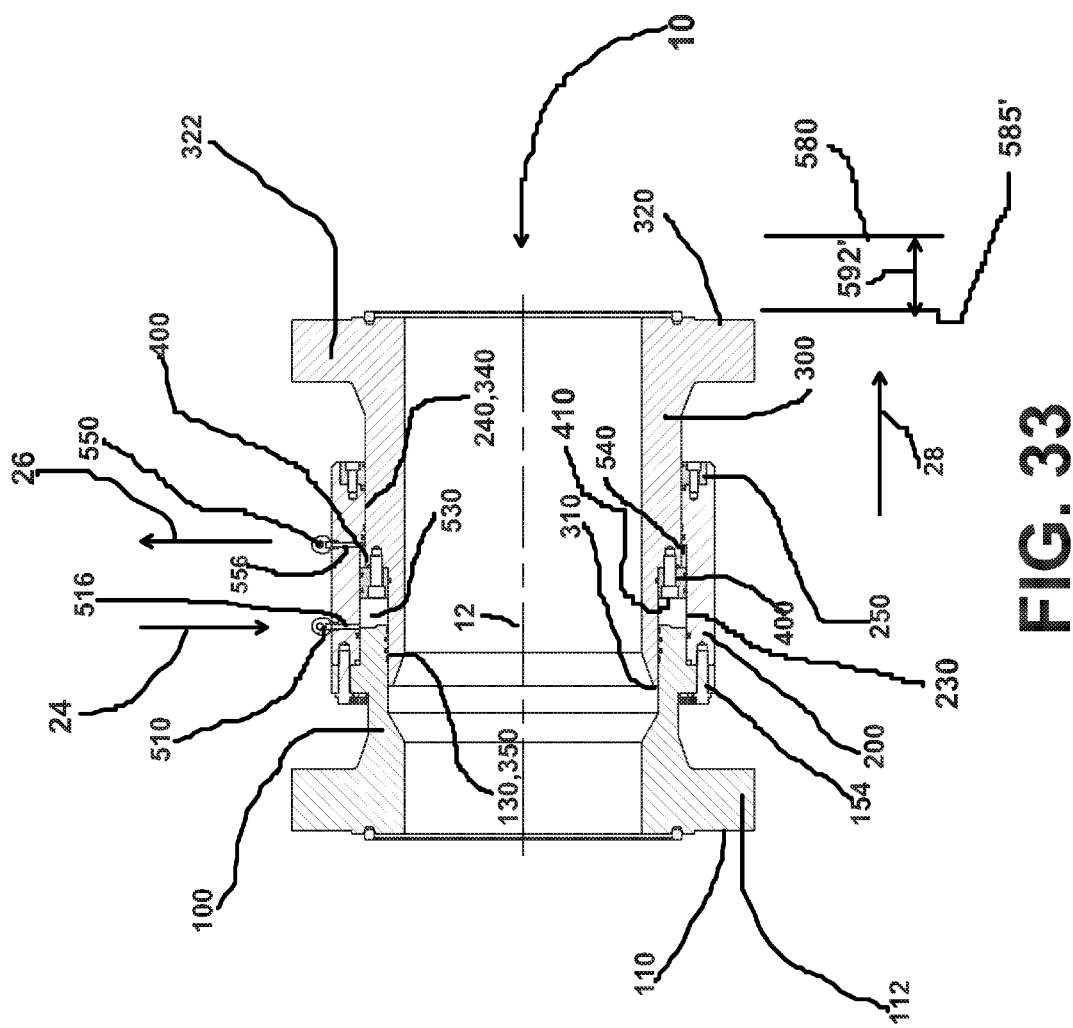
FIG. 33 is a side sectional view of the expandable/retractable device shown in FIG. 1, shown in a partially extended state.
Figure 34:
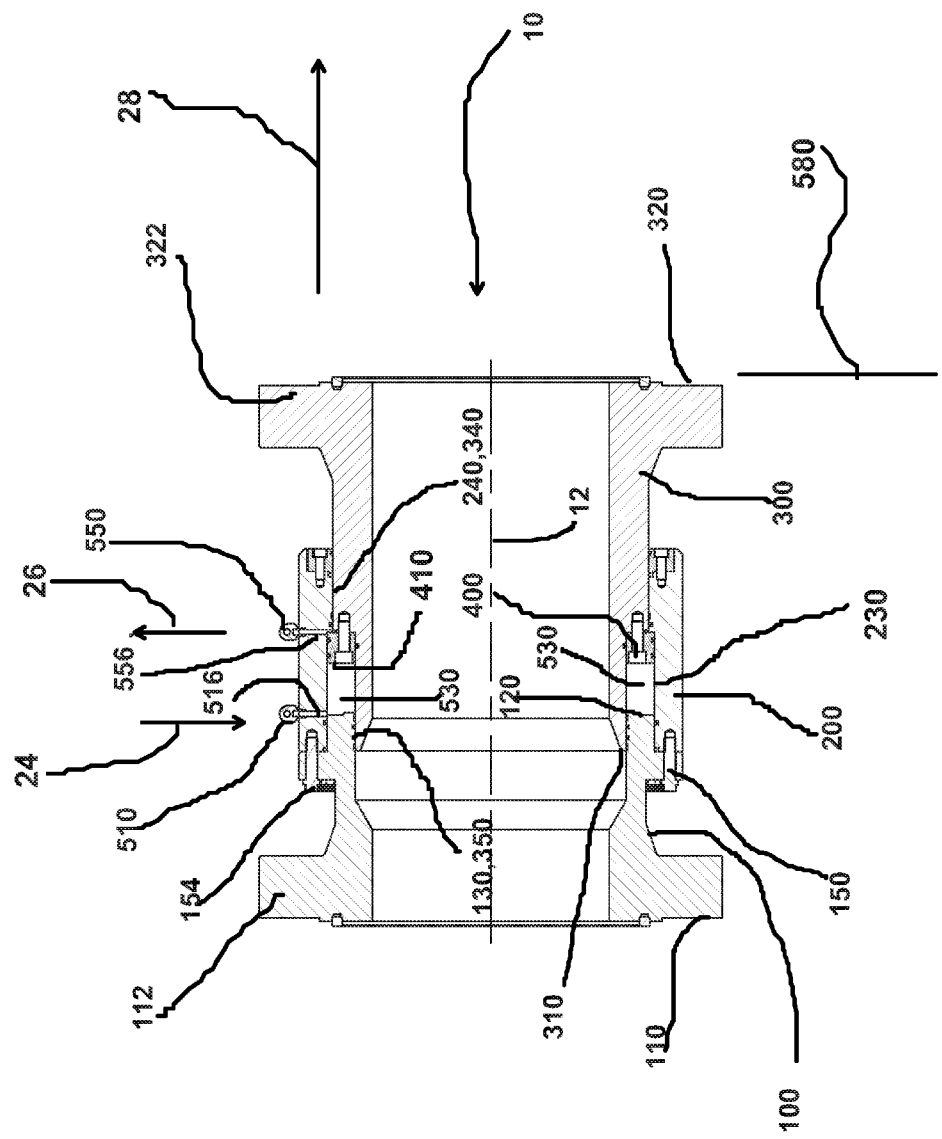
FIG. 34 is a side sectional view of the expandable/retractable device shown in FIG. 1, shown in a fully extended state.
Figure 35:
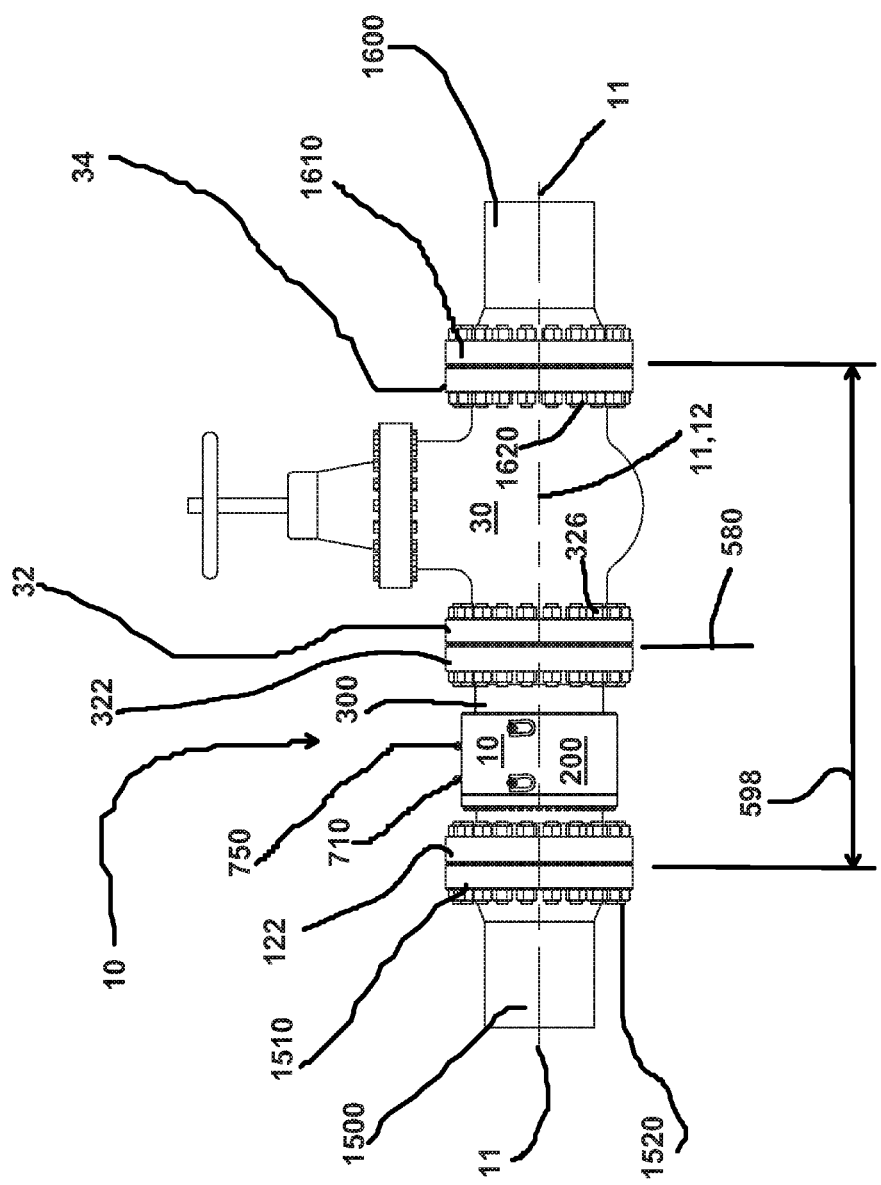
FIG. 35 is a side view of a valve attached to a piping system with the expandable/retractable device shown in FIG. 1, shown in a fully extended state, and with the valve fastened to the piping system using a plurality of fasteners on the sets of flanges.

FIGS. 28 through 35 schematically show one embodiment of a method and apparatus to install a valve using a telescoping flange. FIGS. 28 and 29 show the valve 30 being lowered and aligned vertically and longitudinally (schematically indicated by vertical arrow 20) with the piping system incorporating expandable/retractable device 10. FIG. 30 is a side view of valve 30 now aligned with piping system 1500, 1600 incorporating expandable/retractable device 10. FIG. 31 shows new packing unit 33' being inserted into gap 592 between flanges 322 and 32. In one embodiment the next step is includes moving valve 30 in the direction of arrow 24, such as by using lifting/moving device 1800, while maintaining a substantially constant vertical height for valve 30, creating a gap between the right hand set of flanges (34 and 1610), and installing packing 33" between this set of flanges (packing 33" is not shown being installed). Maintaining a constant vertical height of valve 30 minimizes the risk of damage to valve 30, piping unit 1600, and/or any components of the packing. In various embodiments packing 33' and/or 33" can be installed in valve 30 (and/or the connecting flange of piping system 1500/1600) before valve 30 is lowed into place. FIG. 31 is a side view of the valve 30, piping system 1500,1600, and fluid powered system 5 connected to connectors 710 and 720. Here, because extension is being done for unit 10 (flange 322 moved in the direction of arrow 22 in FIG. 31) fluid will enter first connector 510 and exit second connector 550). The process of extension will be explained in more detail below in connection with FIGS. 32 through 34. Valve support/relocation system 1800 can be connected to valve 30. FIG. 31 shows the expandable/retractable device 10 now put in an extended state with flange 322 being extended (in the direction of arrow 22) from position 585 to position 580 closing the gap 592 between the flanges. In various embodiments position 580 does not need to be fully extended, and merely closes enough to allow threaded fasteners (e.g., 326 between flanges 32 and 322 and/or 1620 between flanges 34 and 1610) need be closed to allow fasteners to continue the closing process for the gap. FIG. 35 shows threaded fasteners (e.g., 326 between flanges 32 and 322 and/or 1620 between flanges 34 and 1610) connecting valve 30 to piping system 1500,1600.

Figure 32:
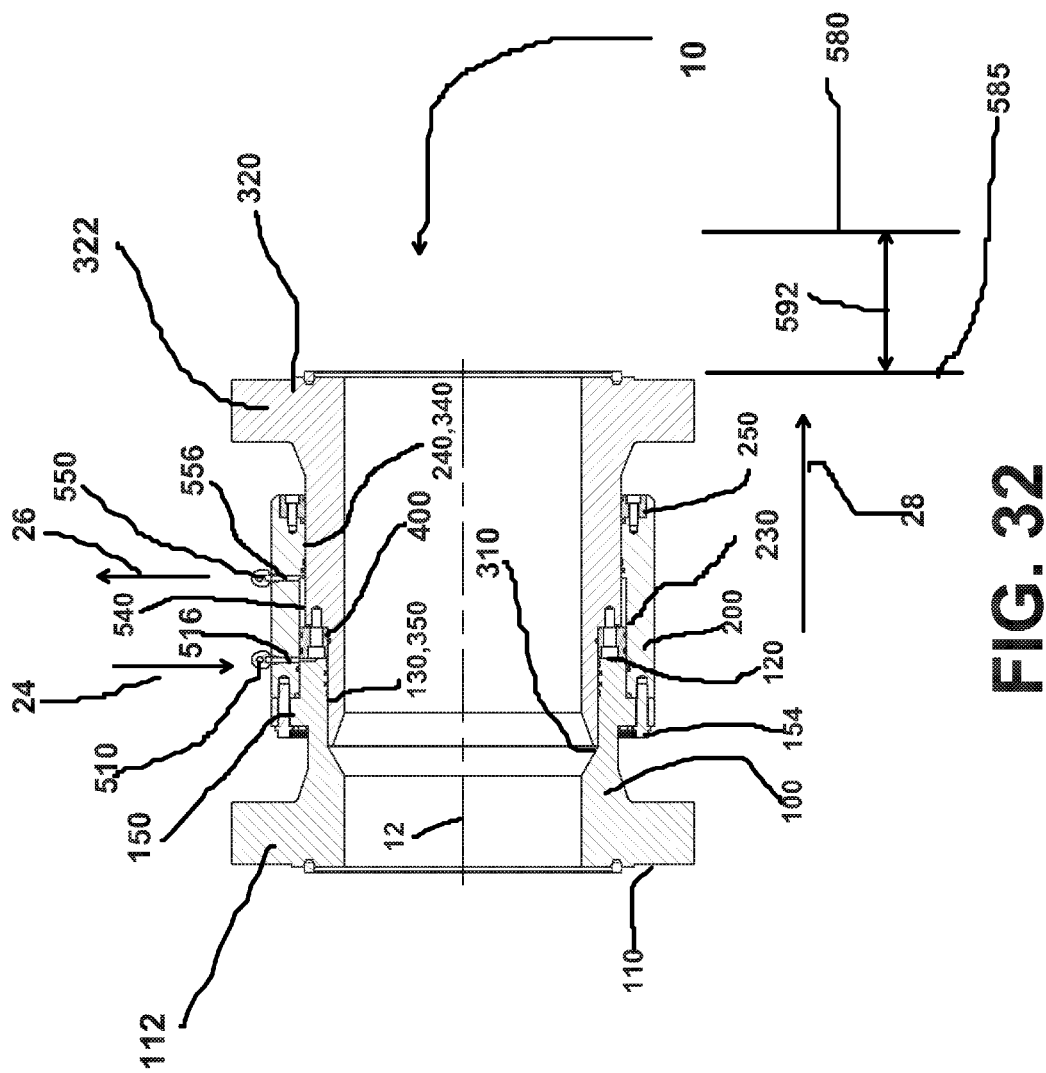
FIG. 32 is a side sectional view of the expandable/retractable device shown in FIG. 1, shown in a fully retracted state.

FIGS. 32 through 34 schematically show the process of expandable/retractable device 10 changing from a retracted to extended state, or where section 300 slidably extends from section 100. FIG. 32 is a side sectional view of expandable/retractable device 10, shown in a retracted state. In the extended state section 300 has been slidingly moved towards the left such that first end 410 of perimeter ring 400 is in contact with second end 120 of section 100, and second end 320 of section 300 is located in the retracted position 585. In order to move second end 320 of section 300 to the right (schematically indicated by arrow 28) a hydraulic fluid source can be fluidly connected to first connector 510 and fluid pumped in into port 516 (schematically indicated by arrow 24) into first chamber 530 which pushes on first end 410 of sealing ring 400 (best shown in FIG. 24). Sealing ring 400 is connected to section 300 via plurality of fasteners 404 causes both sealing ring 400 and connected section 300 to extend (schematically indicated by arrow 28). FIG. 33 is a side sectional view of the expandable/retractable device 10 shown in a partially extended state. Fluid has continued to be pumped into port 516 causing fluid to enter first chamber 530 and section 300 to continue to move to the right (schematically indicated by arrow 28) and causing second end 320 to move from position 585 to position 585'. FIG. 34 is a side sectional view of the expandable/retractable device 10, shown in a fully extended state. Fluid has continued to be pumped into port 516 causing fluid to enter first chamber 530 and section 300 to continue to move to the right (schematically indicated by arrow 28) and causing second end 320 to move from partially extended position 585' to fully extended position 590. In the fully extended position second end 420 of ring 400 is in contact with shoulder 216 of body 200. The total amount of extension from position 585 to position 590 is schematically indicated by gap 592. However, the total amount of extension can be limited to the amount of gap between flange 322 of section 300 and flange 32 of valve 30. During any of the steps of extension second connector 550 can be connected to a fluid retrieval system to collect any fluid located in second chamber 540 which fluid will exit second chamber 540 (as sealing ring 400 moves in the direction of arrow 28) through port 556.

Figure 36:
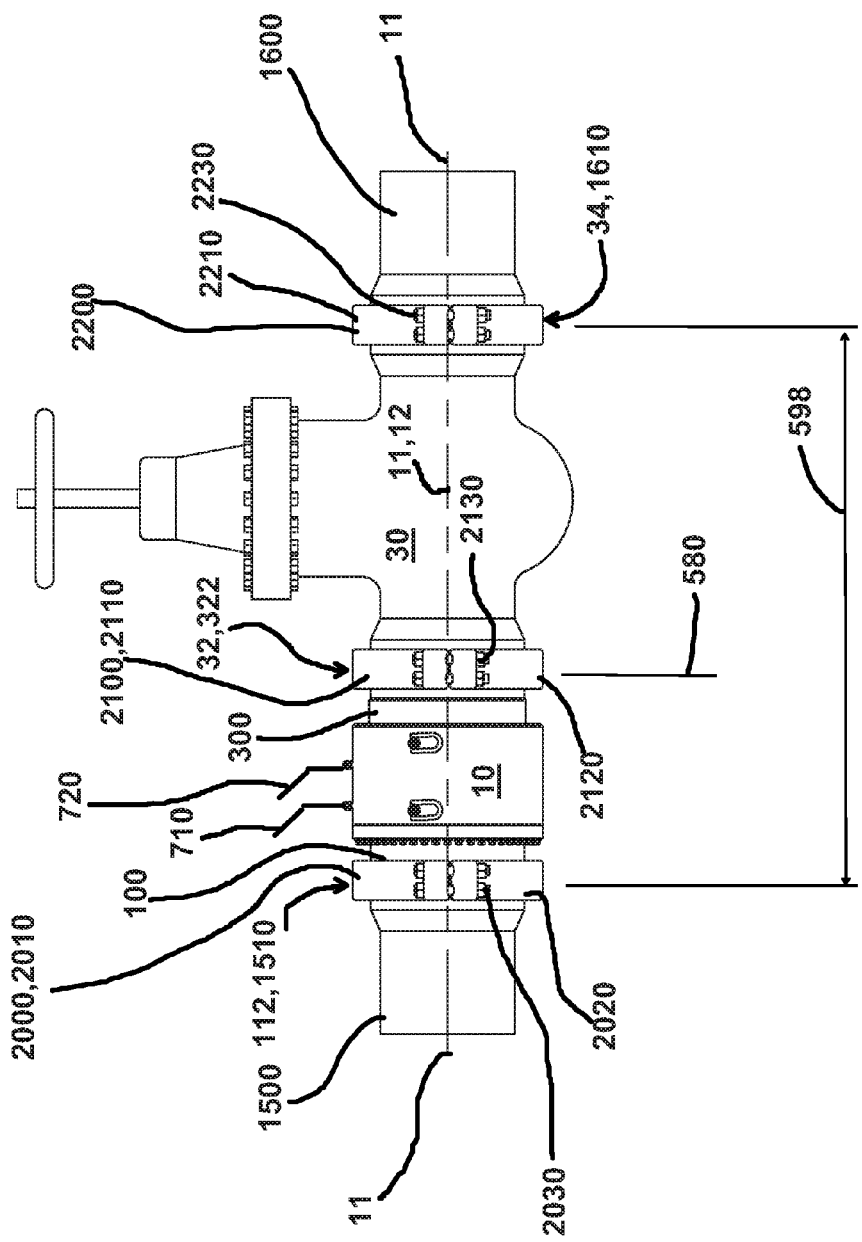
FIG. 36 is a side view of a valve attached to a piping system incorporating the expandable/retractable device of FIG. 1, and with the connections being made by wedge type connecting brackets with hubs instead of flanges.

FIGS. 36 through 41 schematically show another embodiment of the method and apparatus to remove a valve. FIG. 36 is a side view of a valve 30 attached to a piping system 1500, 1600 incorporating expandable/retractable device 10, and with the connections being made by wedge type connecting brackets 2100,2200 with hubs (for 2100 hubs 322,32 and for 2200 hubs 32,1610) instead of flanges.

Figure 37:
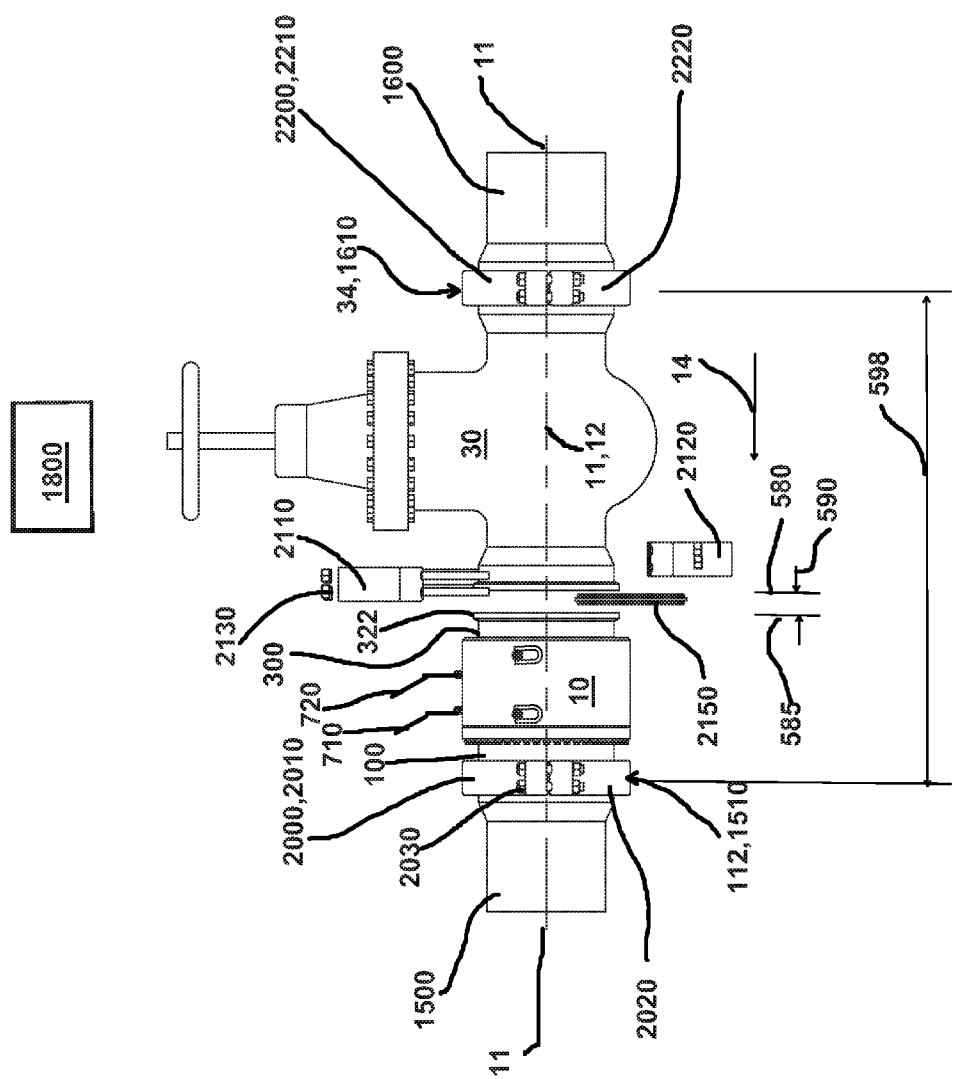
FIG. 37 is a side view of the valve and piping system of FIG. 36 with the wedge type connecting bracket of one connection removed between the expandable/retractable device of FIG. 1, the expandable/retractable device placed in a retracted position creating gap between the connecting hubs, and the sealing ring being removed from the gap.
Figure 40:
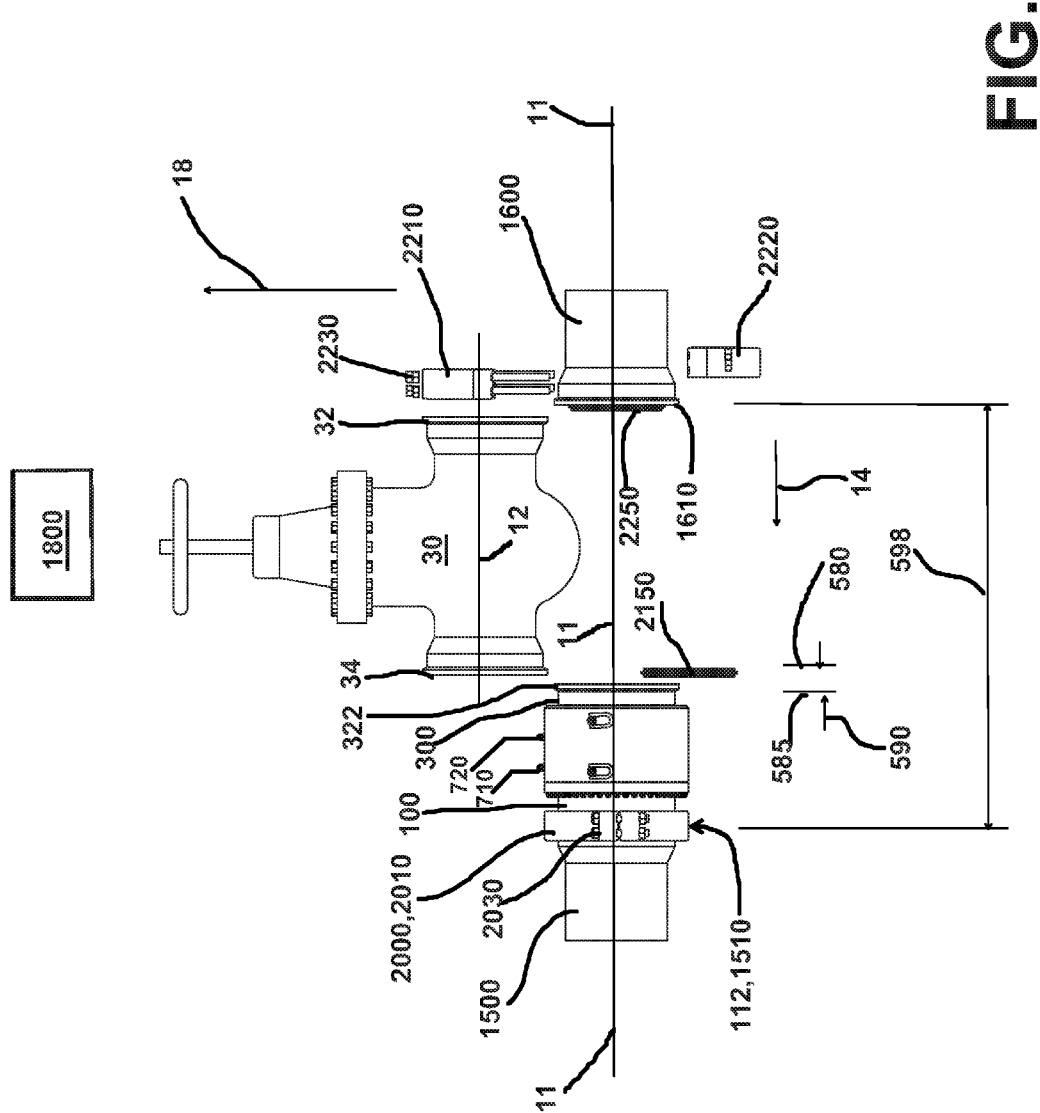
FIG. 40 shows the now detached valve being removed from the piping system.
Figure 41:
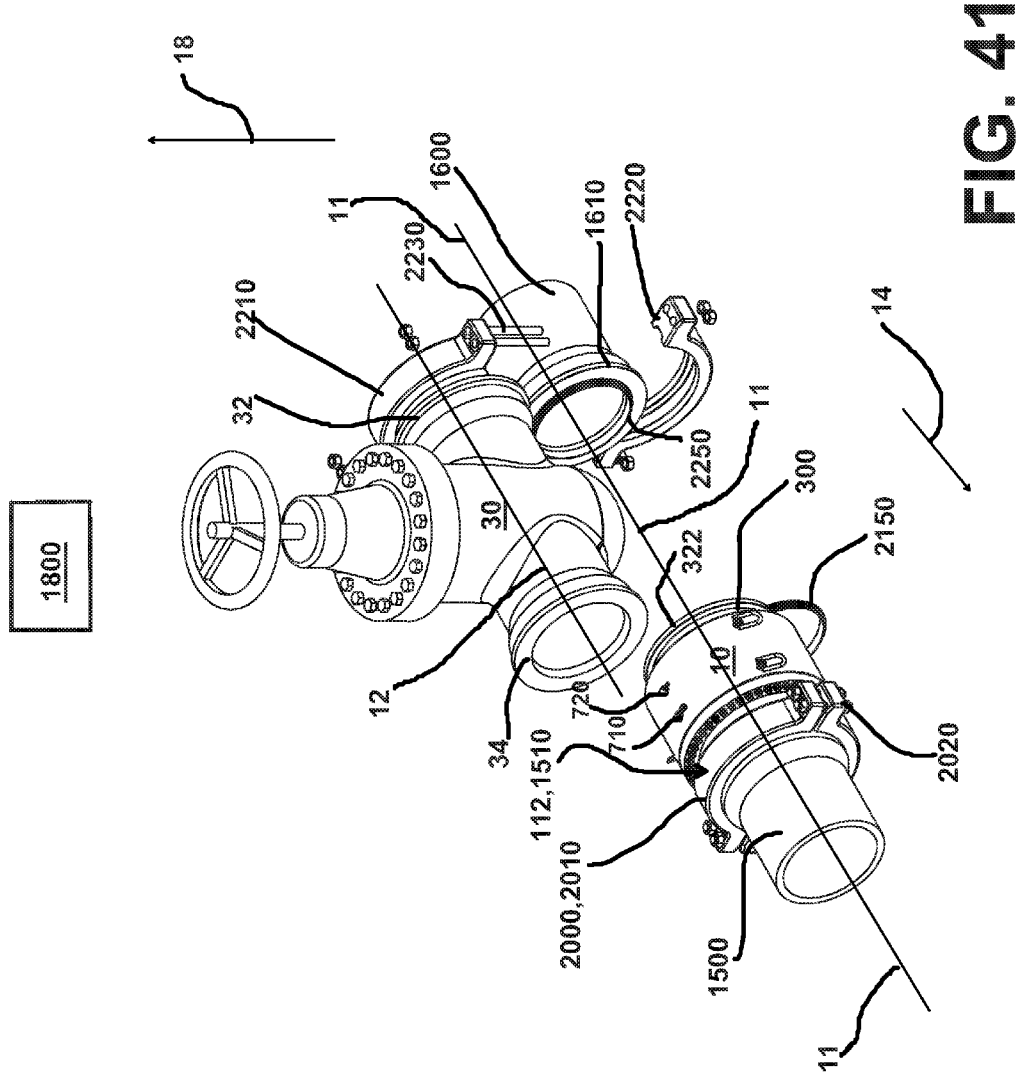
FIG. 41 is a perspective view showing the now detached valve being removed from the piping system.

FIG. 37 is a side view of the valve and piping system 1500,1600 with the wedge type connecting bracket 2100 of one connection removed between the expandable/retractable device 10, the expandable/retractable device 10 placed in a retracted position creating gap 590 between the connecting hubs 322,32, and the sealing ring 2150 being removed from the gap 590 (schematically indicated by arrow 598), and fluid powered system 5 connected to connectors 710 and 720. Here, because retraction is being done for unit 10 (hub 322 moved in the direction of arrow 14 in FIG. 37) fluid will enter second connector 720 and exit first connector 710). The process of retraction has been explained in connection with FIGS. 6 through 12. Valve support/relocation system 1800 can be connected to valve 30. In one embodiment valve support/relocation system 1800 can be a hoist, crane, forklift, etc. FIG. 37 shows the expanding/retracting device 10 now put in a retracted state with hub 322 being retracted (in the direction of arrow 14) from position 580 to position 585 creating a gap 590. In various embodiments position 585 does not need to be fully retracted, and merely a gap 590 need be created to provide a enough room to remove the sealing ring 2150 between valve 30 and expandable/retractable device 10. Sealing ring/packing unit 2150 can be a conventionally available for sealing between wedge type connectors with hubs. FIG. 38 is a perspective view of one embodiment of a sealing ring 2150 that can be used to seal between the valve 30 and its nearest connection, this embodiment showing a sealing ring for a wedge/hub type connection. FIG. 39 is a sectional view of sealing ring 2150 taken through the lines 39-39 of FIG. 38. Sealing ring 2150 can include first end 2152, second end 2154, and have a width or distance 2156 between the first and second ends. Sealing ring 2150 can also have protruding middle section 2157. FIGS. 40 and 41 are side and perspective views showing the now detached valve 30 being removed from the piping system 1500,1600. Although sealing ring 2150 is shown removed from the connection between hubs 322 and 34; second sealing ring 2250 is shown still inserted into hub 1610, and one can see first end 2252 of sealing ring 2250 extending beyond the end of hub 1610, and such first end in a sealing state would extend beyond hub 32 of valve 30 and into the interior of hub 32. The extension/width between first and second ends 2252,2254 is what requires a gap to be made between the hubs 32,1610 otherwise sealing ring 2250 would catch on the hubs and resist differential movement in a lateral direction (e.g., in a direction substantially perpendicular to longitudinal axis 11).

The following is a list of reference numerals:

| LIST FOR REFERENCE NUMERALS | |
|---|---|
| (Reference No.) | (Description) |
| 5 | hydraulic fluid source |
| 10 | telescoping unit |
| 11 | longitudinal axis |
| 12 | longitudinal axis |
| 14 | arrow |
| 16 | arrow |
| 18 | arrow |
| 19 | arrow |
| 20 | arrow |
| 22 | arrow |
| 24 | arrow |
| 26 | arrow |
| 30 | valve |
| 32 | first end |
| 33 | packing |
| 34 | second end |
| 35 | packing |
| 40 | distance between first and second ends |
| 52 | first end |
| 54 | second end |
| 56 | width or distance between first and second ends |
| 100 | pipe spool, fixed section |
| 110 | first end |
| 112 | connecting flange |
| 114 | plurality of openings |
| 120 | second end |
| 130 | inner surface |
| 150 | flange to connect body |
| 152 | plurality of openings |
| 154 | plurality of fasteners |
| 200 | body |
| 202 | plurality of eyelets |
| 210 | first end |
| 212 | plurality of openings |
| 214 | plurality of fasteners |
| 216 | shoulder |
| 220 | second end |
| 222 | plurality of openings |
| 230 | first inner surface |
| 240 | second inner surface |
| 250 | ring seal retainer |
| 252 | plurality of openings |
| 254 | plurality of fasteners |
| 280 | plurality of lifting eyes |
| 300 | pipe spool, retracting/extending section |
| 310 | first end |
| 320 | second end |
| 322 | connecting flange |
| 324 | plurality of openings |
| 326 | plurality of fasteners |
| 330 | plurality of openings |
| 340 | first sliding surface |
| 350 | second sliding surface |
| 360 | interior bore |
| 400 | lip seal retracting/extending section |
| 402 | plurality of openings |
| 404 | plurality of fasteners |
| 410 | first end |
| 420 | second end |
| 430 | outer perimeter surface of lip seal |
| 432 | inner perimeter of lip seal |
| 500 | hydraulic system |
| 510 | first connector |
| 512 | hydraulic fitting |
| 514 | quick disconnect (female) |
| 516 | port |
| 530 | first chamber |
| 540 | second chamber |
| 550 | second connector |
| 552 | hydraulic fitting |
| 554 | quick disconnect (male) |
| 556 | port |

| LIST FOR REFERENCE NUMERALS | |
|---|---|
| (Reference No.) | (Description) |
| 580 | extended home position |
| 585 | retracted position |
| 590 | gap |
| 592 | gap |
| 598 | fixed confined space |
| 600 | vent |
| 610 | port |
| 700 | hydraulic source |
| 710 | line from hydraulic source |
| 720 | line from hydraulic source |
| 1000 | seal |
| 1010 | seal |
| 1020 | seal |
| 1030 | seal |
| 1040 | seal |
| 1050 | seal |
| 1060 | seal |
| 1070 | seal |
| 1080 | seal |
| 1100 | seal |
| 1110 | seal |
| 1120 | seal |
| 1130 | seal |
| 1500 | first section of piping/pipe spool piece |
| 1510 | flange |
| 1520 | plurality of fasteners |
| 1530 | support |
| 1532 | support |
| 1550 | weld fitting |
| 1560 | fixed point on weld fitting |
| 1562 | point in space |
| 1564 | arrow |
| 1566 | arrow |
| 1590 | flange |
| 1595 | plurality of fasteners |
| 1600 | second section of piping/pipe spool piece |
| 1610 | flange |
| 1620 | plurality of fasteners |
| 1630 | support |
| 1632 | support |
| 1650 | flange |
| 1660 | fixed point on weld fitting |
| 1662 | point in space |
| 1700 | pipe spool piece |
| 1730 | support |
| 1750 | pipe spool piece |
| 1800 | lifting/moving device |
| 1810 | flange |
| 1820 | plurality of fasteners |
| 2000 | wedge connecting clamp |
| 2010 | first section |
| 2020 | second section |
| 2030 | plurality of fasteners |
| 2050 | ring seal |
| 2052 | first end of seal |
| 2054 | second end of seal |
| 2056 | thickness/distance between first and second ends of seal |
| 2100 | wedge connecting clamp |
| 2110 | first section |
| 2120 | second section |
| 2130 | plurality of fasteners |
| 2150 | ring seal |
| 2152 | first end of seal |
| 2154 | second end of seal |
| 2156 | thickness/distance between first and second ends of seal |
| 2158 | arrow y |
| 2200 | wedge connecting clamp |
| 2210 | first section |
| 2220 | second section |
| 2230 | plurality of fasteners |
| 2250 | ring seal |

-continued

LIST FOR REFERENCE NUMERALS

| (Reference No.) | (Description) |
|---|---|
| 2252 | first end of seal |
| 2254 | second end of seal |
| 2256 | thickness/distance between first and second ends of seal |

All measurements disclosed herein are at standard temperature and pressure, at sea level on Earth, unless indicated otherwise. All materials used or intended to be used in a human being are biocompatible, unless indicated otherwise.

It will be understood that each of the elements described above, or two or more together may also find a useful application in other types of methods differing from the type described above. Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention set forth in the appended claims. The foregoing embodiments are presented by way of example only; the scope of the present invention is to be limited only by the following claims.

The invention claimed is:

1. A method of removing a valve having first and second valve ends with detachable connections that join the valve to first and second pipe spool piece sections, the first pipe spool piece including an expandable/retractable connecting device having first and second device ends and a longitudinal axis, wherein the first and second device ends can be controllably expanded and retracted relative to each other along the longitudinal axis, the first device end being attached to the first pipe spool piece section and the first valve end being detachably connected to second device end with a detachable connector, the second valve end being detachably connected to the second pipe spool piece with a detachable connector;
    (a) removing the detachable connectors of the first and second valve ends;
    (b) causing the first and second device ends of the expandable/retractable connecting device to retract relative to each other so that a gap is formed in between one of the first or second valve ends and one of the first or second pipe spool pieces, wherein the expandable/retractable device includes a first port that communicates with a first cavity and a second port that communicates with a second cavity and further comprising adding pressurized fluid to one of the cavities;
    (c) wherein, between steps "a" and "b", there is at least one annular seal member forming a sealing interface between either:
    the first valve end and the second device end, or
    the second valve end and the end of the second pipe spool piece, and
    (d) after step "b" removing the valve from between the first and second pipe spool pieces.

2. The method of claim 1, wherein before step "d", the at least one annular seal member is removed from the gap.

3. The method of claim 1, wherein there is at least a second annular seal member forming a sealing interface between the other of the first valve end and the second device end of the expandable/retractable connecting device, or the second valve end and second pipe spool piece for which the at least one annular sealing member forms a sealing surface.

4. The method of claim 3, wherein before step "d", a second annular seal member is removed from the second gap.

5. The method of claim 1, further comprising the steps of:
    (f) after step "d", repairing, refurbishing, or replacing the valve, and subsequently placing the repaired, refurbished, or new valve between the expandable/retractable connecting device and the second pipe spool piece, wherein during this step there exists a gap in between one of the first or second valve ends and one of the first or second pipe spool pieces;
    (g) after step "f" causing the first and second device ends of the expandable/retractable connecting device to extend relative to each other to substantially close the gap between one of the first or second valve ends and one of the first or second pipe spool pieces; and
    (h) bolting the connection between the second device end of the expandable/retractable connecting device and either the first or second valve ends, and bolting the connection between the other of the first or second valve end and the second pipe spool piece.

6. The method of claim 1, wherein the first and second pipe spool pieces each include spool longitudinal axes, and during steps "a" through "d", these longitudinal axes are not moved.

7. The method of claim 1, wherein the first and second pipe spool pieces each include closest weld elbows to the valve, and during steps "a" through "d", these closest weld elbows are not moved.

8. The method of claim 1, wherein the first and second pipe spool pieces each include at least one connecting supports, and during steps "a" through "d", these supports are not disconnected.

9. The method of claim 1, wherein the first and second pipe spool pieces each include spool longitudinal axes, and during steps "a" through "d", these longitudinal axes are not moved.

10. A method of installing a valve having a flow bore with a central axis and first and second valve ends to first and second pipe spool piece sections, comprising the steps of:
    (a) providing an expandable/retractable connecting device having first and second device ends and a longitudinal axis, wherein the first and second device ends can be controllably expanded and retracted relative to each other along the longitudinal axis, the first device end of the connecting device having a detachable connector, and connecting the second device end of the connecting device to one of the first or second pipe spool piece sections;
    (b) placing the valve between the first device end of the expandable/retractable connecting device and the second pipe spool piece section, forming a gap in between one of the first or second valve ends and one of the first or second pipe spool pieces;
    (c) causing the first and second ends of the expandable/retractable connecting device to expand relative to each other to at least partially close the gap, wherein the expandable/retractable device has one or more fluid inlet ports that enable inflow of fluid to selectively lengthen or shorten a distance between the first and second device ends of the expandable/retractable device, and further comprising transmitting fluid to at least one of the one or more fluid inlet ports;

(d) bolting the connections from at least one of the first or second valve ends; and (e) wherein, between steps "c" and "d", there is at least one annular seal member forming a sealing interface between either: the first valve end and the second device end of the expandable/retractable connecting device, or the second valve end and the second pipe spool piece.

11. The method of claim 10, wherein during step "c", the gap is formed between the expandable/retractable device and the first valve end.

12. The method of claim 11, wherein before step "c", the at least one annular seal member is placed in the gap.

13. The method of claim 10, wherein between steeps "c" and "d", there is at least a second annular seal member forming a sealing interface between the other of the first valve end and the second end of the expandable/retractable connecting device, or the second valve end and the second pipe spool piece for which the at least one annular sealing member forms a sealing surface.

14. The method of claim 10, wherein the valve includes flanged ends and at least one of the valve flanges is a ring type joint flange.

15. The method of claim 10, wherein the valve and expandable/retractable connecting device include flanged ends and these flanged ends are ring type joint flanges.

16. The method of claim 10, wherein the first valve end and the expandable/retractable device each have a valve face with an annular groove and wherein an annular seal member occupies these annular grooves.

17. The method of claim 10, wherein the at least one annular seal of step "e" is a ring seal with first and second ends and a thickness between the first and second ends, and the gap of step "b" is larger than the thickness of the at least one annular seal, and this larger gap of step "b" is closed during step "c".

18. The method of claim 10, wherein hydraulic fluid is transmitted to a port to selectively lengthen the distance between the first and second ends of the expandable/retractable device.

19. The method of claim 10, wherein the annular seal member has a thickness and in step "b" the gap is greater than the annular seal member thickness, and in step "c" the reduced size gap is less than the annular seal member thickness.

20. The method of claim 10, wherein the first and second pipe spool pieces each include spool longitudinal axes, and during steps "a" through "d", these longitudinal axes are not moved.

* * * * *